US009356901B1

(12) United States Patent  
Kennberg et al.

(10) Patent No.: US 9,356,901 B1  
(45) Date of Patent: *May 31, 2016

(54) DETERMINING MESSAGE PROMINENCE

(71) Applicant: Google Inc., Mountain View, CA (US)

(72) Inventors: Aleksandr Kennberg, Waterloo (CA); Aman Bhargava, Sunnyvale, CA (US); Carlos E. Whitt, San Francisco, CA (US)

(73) Assignee: Google Inc., Mountain View, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/968,980

(22) Filed: Aug. 16, 2013

Related U.S. Application Data

(63) Continuation of application No. 12/962,002, filed on Dec. 7, 2010, now Pat. No. 8,527,597.

(51) Int. Cl.
*G06F 15/16* (2006.01)
*H04L 12/58* (2006.01)

(52) U.S. Cl.
CPC ..................... *H04L 51/26* (2013.01)

(58) Field of Classification Search
CPC .............................. H04L 51/20; G06Q 10/107
USPC ......................................................... 709/206
See application file for complete search history.

(56) References Cited

U.S. PATENT DOCUMENTS

| 6,285,999 | B1 | 9/2001 | Page |
| 6,480,885 | B1 | 11/2002 | Olivier |
| 7,069,308 | B2 | 6/2006 | Abrams |
| 7,136,915 | B2 | 11/2006 | Rieger, III |
| 7,593,740 | B2 | 9/2009 | Crowley et al. |
| 7,818,392 | B1 | 10/2010 | Martino et al. |
| 7,840,502 | B2 | 11/2010 | Li et al. |
| 7,873,996 | B1 | 1/2011 | Emigh et al. |
| 8,214,446 | B1 | 7/2012 | Siegel et al. |
| 8,224,714 | B2 | 7/2012 | Yost |

(Continued)

FOREIGN PATENT DOCUMENTS

| KR | 10-2009-0091854 A1 | 8/2009 |
| WO | 2008/154106 A1 | 12/2008 |

OTHER PUBLICATIONS

Google Groups, "foursquare API." http://groups.google.com/group/foursquare-api/web/api-documentation?pli=1>.

(Continued)

*Primary Examiner* — Asad Nawaz  
*Assistant Examiner* — Syed S Ali

(57) ABSTRACT

In general, the subject matter described in this specification can be embodied in methods, systems, and program products. A request that a server system deliver textual posts to a computing device may be received. Posts may be associated with a geographical place of posting and a temporal age. A value that represents a geographical distance from the computing device to the geographical place of posting can be identified. A score for a post may be based on the value that represents the geographical distance and the temporal age of the post. An indication of the score for the particular post may be provided to the computing device so as to cause the computing device to display an indication of the post and to visibly indicate a prominence of the post. The indication of prominence of the post is based on the indication of the score for the post.

21 Claims, 9 Drawing Sheets

(56) References Cited

U.S. PATENT DOCUMENTS

| | | | |
|---|---|---|---|
| 8,370,062 B1* | 2/2013 | Starenky et al. | 701/467 |
| 8,413,060 B1 | 4/2013 | Agrawal | |
| 8,417,698 B2 | 4/2013 | Yoo | |
| 8,417,729 B2 | 4/2013 | Baker | |
| 8,474,628 B1 | 7/2013 | Appelman et al. | |
| 8,582,801 B2 | 11/2013 | Goto et al. | |
| 2002/0103892 A1 | 8/2002 | Rieger | |
| 2002/0144154 A1 | 10/2002 | Tomkow | |
| 2003/0172120 A1 | 9/2003 | Tomkow et al. | |
| 2004/0221014 A1 | 11/2004 | Tomkow | |
| 2004/0230657 A1 | 11/2004 | Tomkow | |
| 2005/0021963 A1 | 1/2005 | Tomkow | |
| 2005/0198511 A1 | 9/2005 | Tomkow | |
| 2005/0223077 A1 | 10/2005 | Vellanki et al. | |
| 2006/0031775 A1 | 2/2006 | Sattler et al. | |
| 2006/0252547 A1 | 11/2006 | Mizrahi et al. | |
| 2006/0284744 A1* | 12/2006 | Shotland | 341/50 |
| 2006/0284893 A1 | 12/2006 | Hlad et al. | |
| 2006/0294571 A1* | 12/2006 | Moore et al. | 725/135 |
| 2007/0016651 A1 | 1/2007 | Blagsvedt et al. | |
| 2007/0127555 A1 | 6/2007 | Lynch | |
| 2007/0143416 A1 | 6/2007 | Daigle | |
| 2007/0143417 A1 | 6/2007 | Daigle | |
| 2007/0143435 A1 | 6/2007 | Daigle | |
| 2007/0150368 A1 | 6/2007 | Arora et al. | |
| 2007/0174402 A1 | 7/2007 | Tomkow | |
| 2007/0242131 A1 | 10/2007 | Sanz-Pastor et al. | |
| 2007/0293253 A1 | 12/2007 | Matsumoto et al. | |
| 2008/0005341 A1 | 1/2008 | Subbian | |
| 2008/0022302 A1 | 1/2008 | Tanaka et al. | |
| 2008/0098087 A1 | 4/2008 | Lubeck | |
| 2008/0188261 A1 | 8/2008 | Arnone | |
| 2008/0189367 A1 | 8/2008 | Okumura | |
| 2008/0215426 A1 | 9/2008 | Guldimann et al. | |
| 2008/0222551 A1 | 9/2008 | Takamune | |
| 2008/0227385 A1 | 9/2008 | Bappu et al. | |
| 2008/0307472 A1 | 12/2008 | Tanaka et al. | |
| 2008/0313208 A1 | 12/2008 | Hourselt et al. | |
| 2008/0313256 A1 | 12/2008 | Kanazawa et al. | |
| 2009/0006371 A1 | 1/2009 | Denoue et al. | |
| 2009/0049144 A1 | 2/2009 | Suzuki et al. | |
| 2009/0055485 A1 | 2/2009 | Tsai et al. | |
| 2009/0070426 A1 | 3/2009 | McCauley et al. | |
| 2009/0077182 A1 | 3/2009 | Banjara et al. | |
| 2009/0083658 A1 | 3/2009 | Ito et al. | |
| 2009/0106697 A1 | 4/2009 | Ward et al. | |
| 2009/0144392 A1 | 6/2009 | Wang et al. | |
| 2009/0164431 A1 | 6/2009 | Zivkovic et al. | |
| 2009/0164574 A1 | 6/2009 | Hoffman | |
| 2009/0222551 A1 | 9/2009 | Neely et al. | |
| 2009/0259650 A1 | 10/2009 | Schuil | |
| 2009/0265429 A1 | 10/2009 | Gestsson et al. | |
| 2009/0271244 A1 | 10/2009 | Kalasapur et al. | |
| 2009/0282002 A1 | 11/2009 | Reeder et al. | |
| 2009/0291665 A1 | 11/2009 | Gaskarth et al. | |
| 2009/0319518 A1* | 12/2009 | Koudas et al. | 707/5 |
| 2010/0003659 A1 | 1/2010 | Edmonds | |
| 2010/0004857 A1 | 1/2010 | Pereira et al. | |
| 2010/0015975 A1 | 1/2010 | Issa et al. | |
| 2010/0017237 A1 | 1/2010 | Dalesandro et al. | |
| 2010/0088187 A1 | 4/2010 | Courtney et al. | |
| 2010/0106784 A1 | 4/2010 | Wang et al. | |
| 2010/0115114 A1 | 5/2010 | Headley | |
| 2010/0144323 A1 | 6/2010 | Collins et al. | |
| 2010/0153404 A1 | 6/2010 | Ghosh et al. | |
| 2010/0169363 A1 | 7/2010 | Gaedcke | |
| 2010/0199340 A1 | 8/2010 | Jonas et al. | |
| 2010/0205430 A1 | 8/2010 | Chiou et al. | |
| 2010/0241964 A1 | 9/2010 | Belinsky et al. | |
| 2010/0268830 A1 | 10/2010 | McKee et al. | |
| 2010/0273447 A1 | 10/2010 | Mann et al. | |
| 2010/0274792 A1 | 10/2010 | Bhangi | |
| 2010/0274815 A1 | 10/2010 | Vanasco | |
| 2010/0287033 A1 | 11/2010 | Mathur | |
| 2010/0287109 A1 | 11/2010 | Li et al. | |
| 2010/0293029 A1 | 11/2010 | Olliphant | |
| 2010/0306099 A1 | 12/2010 | Hirson et al. | |
| 2010/0313252 A1 | 12/2010 | Trouw | |
| 2010/0323667 A1 | 12/2010 | Oschwald et al. | |
| 2010/0333019 A1 | 12/2010 | Oschwald et al. | |
| 2011/0016179 A1 | 1/2011 | Bechtel | |
| 2011/0022602 A1 | 1/2011 | Luo et al. | |
| 2011/0055723 A1 | 3/2011 | Lightstone et al. | |
| 2011/0078190 A1 | 3/2011 | Samuel et al. | |
| 2011/0099507 A1 | 4/2011 | Nesladek | |
| 2011/0106857 A1 | 5/2011 | Besombe et al. | |
| 2011/0125770 A1 | 5/2011 | Battestini et al. | |
| 2011/0154223 A1 | 6/2011 | Whitnah et al. | |
| 2011/0167125 A1 | 7/2011 | Achlioptas | |
| 2011/0196932 A1* | 8/2011 | Jackson et al. | 709/206 |
| 2011/0196933 A1* | 8/2011 | Jackson et al. | 709/206 |
| 2011/0212430 A1 | 9/2011 | Smithmier et al. | |
| 2011/0225257 A1 | 9/2011 | Tilden et al. | |
| 2011/0238762 A1* | 9/2011 | Soni et al. | 709/206 |
| 2011/0264528 A1 | 10/2011 | Whale | |
| 2011/0314111 A1 | 12/2011 | Wang et al. | |
| 2012/0042020 A1 | 2/2012 | Kolari et al. | |
| 2012/0066312 A1* | 3/2012 | Kandekar et al. | 709/205 |
| 2012/0110135 A1* | 5/2012 | Sparks | 709/219 |
| 2012/0135744 A1 | 5/2012 | Curtis et al. | |
| 2012/0143963 A1 | 6/2012 | Kennberg et al. | |
| 2012/0233256 A1* | 9/2012 | Shaham et al. | 709/204 |
| 2014/0304260 A1 | 10/2014 | Ulm | |

OTHER PUBLICATIONS

Purdy, Kevin, "FourWhere Maps Out Foursquare Tips for Everybody," Lifehacker; Mar. 9, 2010, http://lifehacker.com/5489053/fourwhere-maps-out-foursquare-tips-for-everybod>.

Thornton, James, "Find shops, restaurants, bars and amenities round you." Softonic: Let's Download!; Jan. 25, 2010, http://aroundme.ensoftonic.com/iphone>.

Wikipedia, "Foursquare (service)/" http://en.wikipedia/org/wiki/foursquare_%28service%29?.

Wikipedia, "Twitter" http://en.wikipedia.org/wiki/Twitter>.

IPRP/Written Opinion and ISR for PCT/US2011420641 mailed May 2, 2011, 8 pages.

'Reading gets personal with popular items and personalized ranking' [online]. The Official Google Blog, Oct. 22, 2009, [retrieved on Jan. 27, 2010]. Retrieved from the Internet: http://googleblog.blogspot.com/2009/10/treading-gets-personal-with-popular-items-and-personalized-ranking.

'Gmail' [online], Wikipedia, Mar. 20, 2010, [retrieved on Mar. 22, 2010]. Retrieved from the Internet: http://en/wikipedia.org/w/index.php?title-gmail&oldid-350982667.

Facebook rolls out revamped news feed [online], The Christian Science Monitor, Oct. 23, 2009, [retrieved on Jan. 27, 2010]. Retrieved from the Internet: http://www.csmonitor.com/layout/set/print/content/view/print/261662.

International Search Report issued in PCT/US20111023590 on Sep. 27, 2011.

Uncertified machine translation of KR 10-2009-0091854 (21 pages).

IPRP and Written Opinion from corresponding International Patent Application No. PCT/US2011/023590, mailed Aug. 23, 2012 (7 pgs.).

E. A. Vander Veer, Facebook: The Missing Manual, first edition, Published by O'Reilly Media, Inc. 2008, pp. 64-66, Sec. 15.1.

IAB recommendations, examples of standard web advert sizes; Published Nov. 2009, http://en.wikipedia.org/wiki/File: Standard_web_banner_ad_sizes.svg, from internet on Feb. 6, 2013.

Hammitt, Jennifer, document entitled "How to Post Links on Facebook," updated: May 5, 2010 available at http:??www.ehow.com/how_4576098_post-links-facebook.html.

Hollows, Phil, document entitled "Automatic Facebook posts done right," Aug. 16, 2010, available at http://kb.feedblitz.com/article/AA-00576/0/Automatic-Facebook-posts-done-right.html/.

Notice of Allowance dated May 2, 2013 for U.S. Appl. No. 12/962,002.

Non-Final Rejection dated Mar. 2, 2012 for U.S. Appl. No. 12/756,681.

(56) References Cited

OTHER PUBLICATIONS

Final Rejection dated Sep. 27, 2012 for U.S. Appl. No. 12/756,681.
Notice of Allowance dated Apr. 29, 2014 for U.S. Appl. No. 12/756,681.
Non-Final Rejection dated Apr. 3, 2013 for U.S. Appl. No. 12/702,124.
Non-Final Rejection dated Jan. 13, 2015 for U.S. Appl. No. 12/702,124.
Final Rejection dated Sep. 16, 2013 for Application no. 12/702,124 (Attorney Docket No. Le-0387-02-US-Np).
Non-Final Rejection dated Feb. 11, 2013 for U.S. Appl. No. 12/702,155.
Notice of Allowance dated Jul. 12, 2013 for U.S. Appl. No. 12/702,155.
Notice of Allowance dated Oct. 15, 2012 for U.S. Appl. No. 12/702,022.
Non-Final Rejection dated Apr. 26, 2012 for U.S. Appl. No. 12/702,022.
Non-Final Rejection dated Sep. 17, 2012 for U.S. Appl. No. 12/962,002.
Non-Final Rejection dated Mar. 6, 2015 for U.S. Appl. No. 14/076,583.
Taylor, Dave, document entitled "How to Find Your Friends on Face Book With the Facebook Friend Finder," Nov. 28, 2008, Available at http://www.askdavetaylor.com/how_to_find_friends_facebook_facebook_friend_finder.html.
Allmond, Kenya, document entitled "Facebook Friend Finder: What You May Not Know About Your Data," Jun. 22, 2009, Available at http://gdgtgrl.net/2009/06/22/facebook-friend-finder-what-you-may-not-know-about-your-data/.
Smith, Justin, document entitled "Facebook Now Suggesting Friends Found in Imported Contact Lists?" Jun. 12, 2009, Available at http://www.insidefacebook.com/2009/06/12/facebook-now-suggesting-friends-found-in-imported-contact-lists/.
International Search Report and Written Opinion in International Application No. PCT/US2011/063794, dated Feb. 7, 2012, 10 pages.
Non-Final Rejection received for U.S. Appl. No. 14/076,583, Nov. 4, 2015.
Final Office Action dated Jul. 30, 2015 for U.S. Appl. No. 12/702,124.
Notice of Allowance dated Jun. 19, 2015 for U.S. Appl. No. 14/076,583.
Patent Examination Report No. 1 mailed Jul. 22, 2015 in Australian Patent Application No. 2011253646.

* cited by examiner

DETERMINING MESSAGE PROMINENCE

RELATED APPLICATIONS

The subject application is a continuation application of U.S. patent application Ser. No. 12/962,002, filed on Dec. 7, 2010, the entire content of which is herein incorporated by reference.

TECHNICAL FIELD

This document generally describes techniques, methods, systems, and mechanisms for determining message prominence.

BACKGROUND

The present disclosure generally relates to messaging systems. A user of a computing device (e.g., an application telephone or a desktop computer) may use the device to post textual and multimedia posts (e.g., electronic messages) with a micro-blogging application, so that other people that use a micro-blogging service and that "follow" or "subscribe" to the user can receive the post. The post can be transmitted by the computing device to a server system that hosts the micro-blogging service. The server system may disseminate the post to the users that have subscribed to the author of the post. Additionally, people that use the micro-blogging service may request to view posts that authors have designated as being "public" posts.

SUMMARY

This document describes techniques, methods, systems, and mechanisms for determining message prominence and acting on such a determination, such as in the grouping or sorting of messages to be displayed to users of a computerized service like a micro-blogging service or other service that involves the posting of one or more messages from each of multiple users. In general, a user of a messaging service may use a computing device to view posts that other users of the messaging service have authored. The computing device may send a request for posts to a server system that implements the messaging service. The server system may identify a set of posts for display to the user, and may score each of the posts using both an age of the post and geographical distance between a location of the computing device and a location of the post (e.g., where a location of the post may be a location, at a time that the post was submitted by an authoring computing device to the server system, of the authoring computing device). Additionally or alternatively, the score for each of the posts may be based on a score of a venue at which an authoring computing device was associated with when the post was submitted.

The post scores may be used to assign a prominence to each of the posts. For example, the server system may rank a set of posts that are to be transmitted back to the computing device. The computing device may display the posts in an order based on their ranking. Also, the server system or the computing device may categorize the posts as having a "high prominence" or a "low prominence" based on their scores. The computing device may display posts that have a high prominence differently than posts that have a low prominence.

In general, one aspect of the subject matter described in this specification can be embodied in a computer-implemented method. The method includes receiving, at a server system and from a computing device that is remote from the server system, a request that the server system deliver to the computing device textual posts that a plurality of authors have submitted to a messaging system. Each particular post of at least some of the posts is associated with (i) a geographical place of posting from which the particular post is determined to have been authored, and (ii) a temporal age that corresponds to a time that the particular post was authored.

The method includes identifying, by the server system and for each particular post, a value that represents a geographical distance from a location that is associated with the computing device to the geographical place of posting for the particular post. The method includes determining, by the server system and for each particular post, a score for the particular post, the score being based on at least: (iii) the value that represents the geographical distance to the geographical place of posting for the particular post, and (iv) the temporal age of the particular post. The method includes providing, by the server system and to the computing device for each particular post, an indication of the score for the particular post, so as to cause the computing device to display an indication of each particular post and visibly indicate a prominence of each particular post. The indication of prominence of each particular post is based at least in part on the indication of the score for each particular post. At least two of the particular posts having different visible indications of prominence based at least in part on the at least two particular posts having different indications of scores.

Another aspect of the subject matter described in this specification can be embodied in a computer-implemented method. The method includes determining, by a mobile computing device, a location that is associated with the mobile computing device. The method includes receiving, at the mobile computing device, user input for causing the mobile computing device to display indications of textual posts that a plurality of authors have submitted to a messaging service. The method includes submitting, by the mobile computing device and to a server system, (i) a request for the posts and (ii) the location that is associated with the mobile computing device.

The method includes receiving, at the mobile computing device and from the server system, for each particular post of at least a plurality of the posts, an indication of a prominence of the particular post. The received indication of prominence having been determined by the server system for each particular post based at least in part on a time that an author submitted the particular post to the messaging service and based at least in part on a distance between the location that is associated with the mobile computing device and a location that is associated with the particular post. The method includes displaying, by the mobile computing device, an indication of each particular post and the indication of the prominence for each particular post. At least two of the particular posts have different displayed indications of prominence.

In yet another aspect, the subject matter that is described in this specification can be embodied in a system. The system includes a location identifier to identify a location of a mobile computing device. The system includes a means for assigning a prominence to each of multiple posts that a plurality of authors submitted to a messaging system based (i) at least in part on a time that each of the posts was submitted to the messaging system, and (ii) at least in part on a location that is associated with each of the posts. The system includes a post displayer to display an indication of each of the multiple posts and to display an indication of the prominence for each of the multiple posts.

Particular embodiments can be implemented, in certain instances, to realize one or more of the following advantages.

A display of micro-blogging posts may be displayed to a user in a manner that enables the user to view those posts that are most relevant to the user. The posts that are most relevant to the user may be those posts that are close to the user in time-space. Posts may further be identified as relevant based on a prominence of a venue at which the posts were submitted. Users may be able to more readily identify socially-generated content that is relevant to the user's present location, or past locations of interest. User browsing of public posts may be increased.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
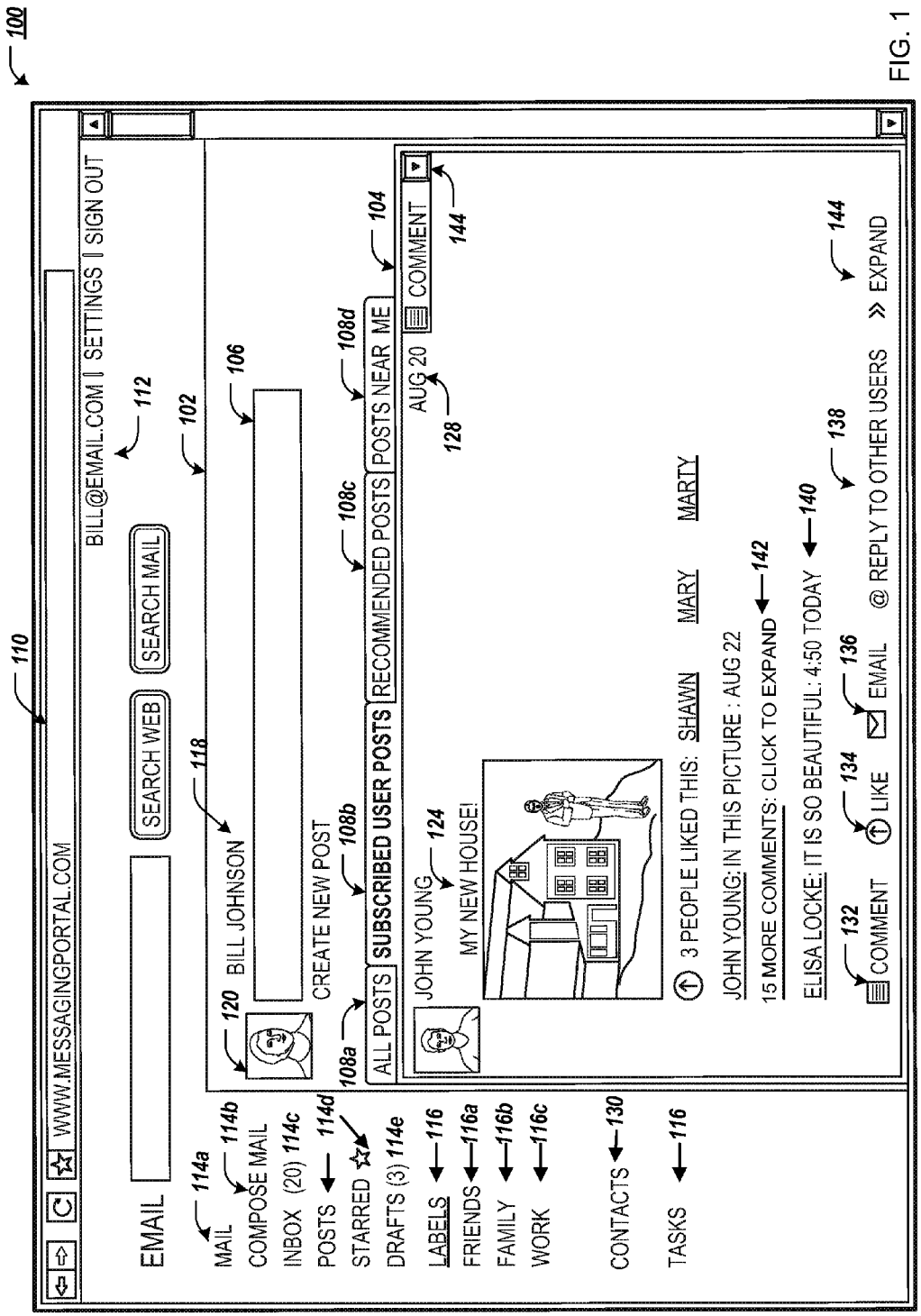
FIG. 1 is a screenshot of an example web-based messaging system interface.

This document generally describes determining message prominence in a computer-based messaging service. In general, a requesting user of the messaging service may request to view posts that other users of the messaging service have authored. The posts may be displayed to the requesting user on a computing device, where each of the posts is associated with a visual prominence. In some examples, the prominence is based on both an age of the post and a geographical location where the particular post was submitted. In other examples, the prominence is based on a score for a venue that is the geographical location of post submission (e.g., a venue at which the posting user "checked-in" to submit the post to the messaging service). The prominence of the posts that are displayed to the requesting user can affect an ordering or grouping of the posts as displayed on the computing device, or a form of display (e.g., an icon associated with the post).

In more detail, authoring users of a messaging service may provide user input to generate posts that include text and multimedia content. An authoring user may be an individual person or an organization. The authoring users may submit the posts to the messaging service without identifying other recipient users of the messaging service that are to receive the posts. The posts may be disseminated to those recipient users that have provided user input that they wish to receive posts that are by one or more of the authoring users. Thus, when an authoring user submits a post, she may know that the post will be disseminated to all of her followers.

Further, an authoring user may indicate that her posts are publicly available so that non-following users may view the posts. Thus, a particular user may request that the messaging service provide to the particular user a set of posts that are publicly available. The set of posts may be selected for the particular user based various criteria, and displayed to the particular user in a manner that emphasizes specific posts.

As an illustration, a user of the messaging service, Katie, may login to a messaging service using her mobile device. Katie may select a graphical interface element to invoke a display of posts that have been authored by individuals that Katie "follows" (e.g., posts that the user Katie has subscribed to or posts that Katie would like to receive or read). A list of posts by individuals that Katie is following may be displayed in a time-sorted order. The list may not include posts by individuals that Katie is not following.

Katie may also select a graphical interface element that is labeled "Nearby." In response to the selection, Katie's mobile device may display a list of posts by individuals that have recently posted near Katie's location. The list may include posts both by users that Katie follows, and by users that Katie is not following. The posts may be selected by the messaging service's server system to be displayed to Katie based on the posts being submitted recently, and based on the posts being posted at a location that is near Katie.

Users of the messaging service may be provided with an opportunity to opt in/out of a feature that identifies the users' geographical locations and transmits the geographical locations to the messaging service with posts. In other words, some users may prefer to submit posts that identify geographical locations of the users at times of posting. Other users may prefer that their posts do not identify geographical locations at times of posting. Thus, these other users' posts may not appear when Katie selects the "Nearby" interface element, even if these other users posted within a few meters of Katie.

Users of the messaging service may be provided with an opportunity to opt in/out of a feature that publicly displays the users' posts. In other words, some users may prefer that their posts can be viewed by any users of the messaging service. Yet, other users may prefer that their posts can be viewed only by those users of the messaging service that are following the users (e.g., those users for which a user has acknowledged a relationship).

Katie's location may be determined as an estimated geographical location of Katie's mobile device using automatic geographical positioning (e.g., GPS, cellular tower triangulation, or Wi-Fi router identification), or a location at which Katie has "checked-in" (e.g., a location that Katie has identified with user input as a place of posting, so that recipients of Katie's posts are displayed the place of posting). The "location" of each of the posts may be similarly identified as an estimated geographical location of a computing device from which the post was submitted, or a place at which a post author had checked in when the post was submitted to the messaging service.

While Katie is in the "Nearby" mode, a group of posts may be selected for display to Katie, where the form of display of the posts is based on several factors (e.g., an age of each of the posts and a place of posting of each of the posts, among other factors). In any event, the group of posts that are selected for display to Katie are each visibly associated with a prominence that is based, at least in part, on both post age and distance to the post (e.g., a distance between a location of Katie's computing device and the location that is associated with the post).

For example, Katie may view the posts in an ordered list of post tiles, where the order of the post tiles is based on each post's age and also on each post's distance from Katie. Thus, the first post in the list may have been authored thirty minutes ago and posted one mile away from Katie, while a second post in the list may have been authored an hour ago and posted two miles away. In this example, however, a single factor (e.g. only age or only distance) may result in the same ordering. The posts may also be grouped, such as into collapsible and expandable sub-lists, including by placing all posts from the past day in one sub-list, all posts from the remainder of the current week in a second sub-list, and all other posts in a third sub-list. Grouping by location may place all posts from a particular venue in a first sub-list (e.g., sorted in reverse chronological order within the sub-list), all posts within walking distance of the venue in a second sub-list, all posts from the same town in a third sub-list, and remaining posts in a fourth sub-list.

On the other hand, using both age and distance as signals to affect post prominence may result in posts that are particularly recent or close to Katie being prominently displayed even though the posts may be far away from Katie or old, respectively. For example, another list of post tiles may include a first post that was authored five minutes ago but was posted five miles away, and a second post that was authored ten minutes ago but was posted three miles away. Yet another example list of post tiles may include a first post that was authored two hours ago but was posted fifty meters away from Katie, and a second post that was authored ten minutes ago but was posted three miles away.

In some examples, the prominence of posts in the list is further or alternatively based on a reputation of a place of posting or a reputation of a poster. As described above, some of the authors of the posts that are displayed to Katie may have "checked-in" to various venues (e.g., coffee shops, restaurants, and stores). If these venues have a good reputation, the score of posts from that location may be more prominently weighted. A venue may have a good reputation based on user rankings of the venue (e.g., one to five stars), quantity of user check-ins at the location, amount of times that users post while checked into the location, and a quantity of times that the venue is identified as an explicit recipient for a post (e.g., the venue is @replied in a body of the post).

In some examples, the reputation of the venue is based on Katie's interaction with the venue. For example, if Katie has @replied a particular venue or has previously posted from a particular venue, posts that are associated with the particular venue may have a score that is more prominently weighted than other posts, other post characteristics being equal.

FIG. 1 is a screenshot of an example web-based messaging system interface. The interface 100 can be viewed by a user of a micro-bogging system implemented by the messaging system after the user logs into his account. The interface 100 can enable the user to submit posts and to receive posts from other people. In this illustration, a user of the messaging service, Bill Johnson, has logged into the messaging interface 100 and is viewing, in the content region 102 of the interface, a post 104 from another user of the messaging service, John Young. A user account may be associated with a computing device when the user account is "logged in" at the particular computing device. Tabs 108a-d allow Bill to view differently filtered lists of posts. Bill can author and submit a post using the input area 106.

More specifically, Bill can visit the messaging interface 100 with an internet browser by typing a URL associated with the portal into the address bar 110. Bill may be prompted to enter his username and password before he is provided use of the interface 100. Upon having logged in, the user account 112 that Bill is logged into may be displayed in the interface window. A similar interface may be generated by a messaging application, or app, that Bill has loaded into his device.

User-selectable interface elements allow Bill to toggle presentation of content in the content region 102 of the interface. If Bill selects the "Mail" link 114a, a list of received email messages may display in the content region 102. Selection of the "Compose Mail" link 114b may invoke presentation in the content region 102 of an interface for sending emails to a recipient (e.g., by typing an email address for the recipient, typing a subject of the email, typing textual content, and clicking a submit button). Selection of the "Posts" link 114d may invoke the micro-blogging service interface that is displayed in the content region 102.

The micro-blogging interface can display a name 118 and picture 120 of the user who is associated with the account 112. In this illustration, the name "Bill Johnson" is associated with the user account "Bill" for the domain "email.com." The input area 106 of the micro-blogging interface may allow Bill to submit content for dissemination to other users of the micro-blogging service. For example, Bill may move a mouse cursor over the input area 106 and click in the input area 160. Upon selecting the area, Bill may type a textual string of characters "I just had the best day ever, and want everyone to know it!" The characters may appear for display in the input area 106.

User selection of the input area 106 may invoke a display of controls for adding multimedia content to the input area, or for inclusion in the post. For example, graphical user interface elements may appear after Bill clicks in the input area 106. The graphical user interface elements may enable Bill to add a picture to a post or a video to the post, either by selecting a source file on his computer or identifying a source file from a location on the internet. If Bill types or pastes a Uniform Resource Locator (URL) in the input area 106, a server system that serves code for generating the messaging interface (or code operating locally at Bill's client device) may identify the string of characters as a URL and fetch content from a computerized device that is associated with the URL for inclusion in the post. For example, the messaging service may present a list of pictures that are linked to from a source document that is associated with the URL, and Bill can select a subset of the displayed pictures to include in the post that he is composing.

When Bill is satisfied with the post that he has generated in the input area 106, Bill may select a "Post" graphical interface element. In this example, the "Post" interface element is not displayed in the screenshot 100, and is provided for display upon user selection of the input area 106. After selection of the "Post" interface element, Bill's post is transmitted by his client computing device over a network to a server system that hosts the micro-blogging messaging service. The server system may identify users that have requested to receive Bill's posts, and may transmit an instance of Bill's post to each user.

In some examples, the "post" may include only the textual and multimedia content that is visible to Bill, or the textual and multimedia content that is viewed by the recipient users. Thus, a description of all post content may be made by a person if the person can view a screenshot of either Bill's display or a recipient user's display. In other examples, the "post" includes additional information necessary to transmit the post, and for the server system to handle the received post.

For example, the additional information may include an identifying number for Bill, a source uniform resource identifier (URI) for multimedia content, etc. The additional information may not be visible to Bill or recipient users. In some examples, a post does not identify users or user accounts of the subscribing users to whom the post should be transmitted or disseminated. The post, however, may include an @replied handle username.

The micro-blogging interface also displays posts from other users. For example, in the illustration depicted in FIG. 1, a single post 104 from the user John Young is displayed. John's post may be a most recent post or most highly ranked post of several posts that may be viewed by scrolling down in the interface using the scroll bar 122. John's post can also be referred to as an "activity" because the post, while originating with content from John, may be expanded with content from other users of the micro-blogging service. For example, in this illustration John's post includes the title "My New House!" 124 and a picture 126 of his house. John's post did not include any additional content and was submitted on the date 128 of August 20.

John's post 104 was received by the micro-blogging service's server system and disseminated to the other users of the micro-blogging service that had selected John as an individual that they would like to follow. For example, Bill may have selected the "Contacts" link 130 of his respective messaging service interface and entered into an input box John's email address and name. The micro-blogging service may have identified that John's email address was associated with a micro-blogging account and Bill may have requested to subscribe to John's posts. In some examples, John is prompted to confirm that Bill may receive his posts before John's posts are disseminated to Bill.

John's post 104 also shows that three people (Shawn, Mary, and Marty) "Liked" John's post. A "Like" is an indication, by a recipient of a post, that the recipient has a favorable opinion of the post. A like may be invoked by a single-input user selection of a graphical interface element (e.g., the "Like" button 134).

John's post also shows that on August 22, a user tagged or otherwise indicated that John Young was in the picture of the house. In this illustration, a user who tagged John is not identified, however, a visual identification of the tagging user may be provided, in some examples.

John's post includes a display of a comment 140, "It is so Beautiful" by Elisa Locke at a time of 4:50 today. Elisa Locke may have received a display of John's post in a micro-blogging interface similar to the one depicted in FIG. 1. Elisa may have selected a comment button 132 and entered the text "It is so Beautiful" into a comment input box. Upon sending the comment, John's post may be updated to include Elisa's comment (as illustrated in post 104), and the updated post may be re-disseminated to all post recipients. John's post 104 also includes an interface element 142 that enables Bill to expand a display of John's post to show comments from other users that are collapsed in the present view.

The messaging interface 100 includes mechanisms for Bill to interact with John's post 104. For example, Bill may select the comment interface element 132, and in response, user interface elements and controls may appear that enable Bill to generate and submit textual or multimedia content for inclusion in the post. The comment may be distributed to all users that received the post so that when these other users view the post they see Bill's comment. The post may be updated for all users, whether the users have viewed the post previously or not.

Bill can also select a "Like" interface element 134 to indicate his favorable opinion of the post. Selection of the "Like" interface element 134 can impact a scoring of the post (potentially increasing a likelihood that the post will be displayed to other users as a recommended post), alert other users that Bill thought that the post was interesting, and be used to develop a personalized model of posts that Bill likes (to aid in providing relevant content as recommended posts for Bill's account).

Bill may add other people to the post. For example, Bill may select the "@ Reply" interface element 138. In response, graphical interface elements and controls may display that enable Bill to identify other users of the micro-blogging service. Upon receiving identifications of these other users from Bill's client device, the micro-blogging service may add the other user's to a list of post recipients. Thus, John's post 104 may appear in the @replied users' post streams. The new, @replied users may be enrolled as subscribed to the specific post so that the new users are informed or able to view all new activity on the post (e.g., comments, likes, content added by John, etc.) The new users may be subscribed to the particular post, but may not be subscribed to the post author.

A user may @reply a post to another user by tying the @handle into the body of a post, or into a comment of the post. After the post or comment is submitted, the local machine or a server system may identify a full username for the handle (e.g., handle@domain.com) and add the user account associated with the full username as a subscribed user for the post.

As another option, Bill may email the post by selecting the email interface element 136 and entering an individual's email address. In response, the post content may be emailed to the individual's email account. The recipient of the post content may not be subscribed to the post (as with an @reply where updates on the post content are viewed with the received email message). The email message, however, may include a link or other mechanism that enables the user to subscribe to the particular post.

The "Expand" option 144 may enable Bill to expand John's post 104 so that all content associated with the post 104 (e.g., all content that he submitted, all comments, etc.) may be viewed at a single time in an expanded form. The post may increase in size within the interface 100 or may appear as a separate "pop-up" box that is overlaid on the interface 100. In some examples, the post 104 displays all users that are subscribed to the post, and whether the users subscribed to the individual post, follow the post author, were recommend to the post, or were @replied to the post. In some examples, users can select additional features through the drop down interface element 144. Example features can include an ability to delete the post from the user's stream, ignore additional activity on the post so that the post does not jump to the top of the user's stream with every comment, subscribe to the author of the post, and unsubscribe the author of the post.

As illustrated, John's post may not be solely static text or multimedia content that was submitted by John for dissemination to other users. The users that received the post may be able to comment on the post, add content, tag people in pictures or videos, and add other users to the post. Thus, the post may also be referred to as an "activity" that originates with John as the author, but may grow in content as other users contribute content to the activity.

The messaging system interface 100 includes several tabs 108a-d for switching "views." Each view may include a different set of posts. For example, each view may apply a different filter to the overall set of posts that Bill has received. The "All Posts" tab 108a may display all posts that the micro-blogging service has provided to Bill's account (e.g., because he subscribed to the author, subscribed to the post, or the post was recommended for display to Bill). The "Subscribed User Posts" tab 108*b* may display posts for authors that Bill has subscribed to, but may not include a display of posts that were recommended for Bill. The "Recommended Posts" tab 108*c* may include a display of posts that the micro-blogging system recommended for Bill, but may not include posts for authors that Bill subscribed to.

The "Posts Near Me" tab 108*d* may include a list of posts that were submitted by users near Bill, either users that Bill subscribes to or all users of the micro-blogging service that are near Bill's location. For example, Bill may identify a home location or zip code in the settings of the messaging system, or Bill's location may be identified through a Global Positioning System or other location-identification service that is associated with a mobile device upon which Bill is viewing the messaging interface 100. If a place of posting for a post (e.g., John's post) is near Bill's location, John's post may appear in the "Posts Near Me" tab 108*d*. The "Posts Near Me" tab 108*d* may also be weighted by time so that only recent posts are displayed (e.g., so that the stream illustrates recent activity around Bill's location). The "Posts Near Me" tab 108*d* may identify locations of the recent posts as graphical interface elements overlaid on a map. A prominence of posts displayed by the "Posts Near Me" tab may be determined based both on time of post submission and distance to post location.

Figure 2:
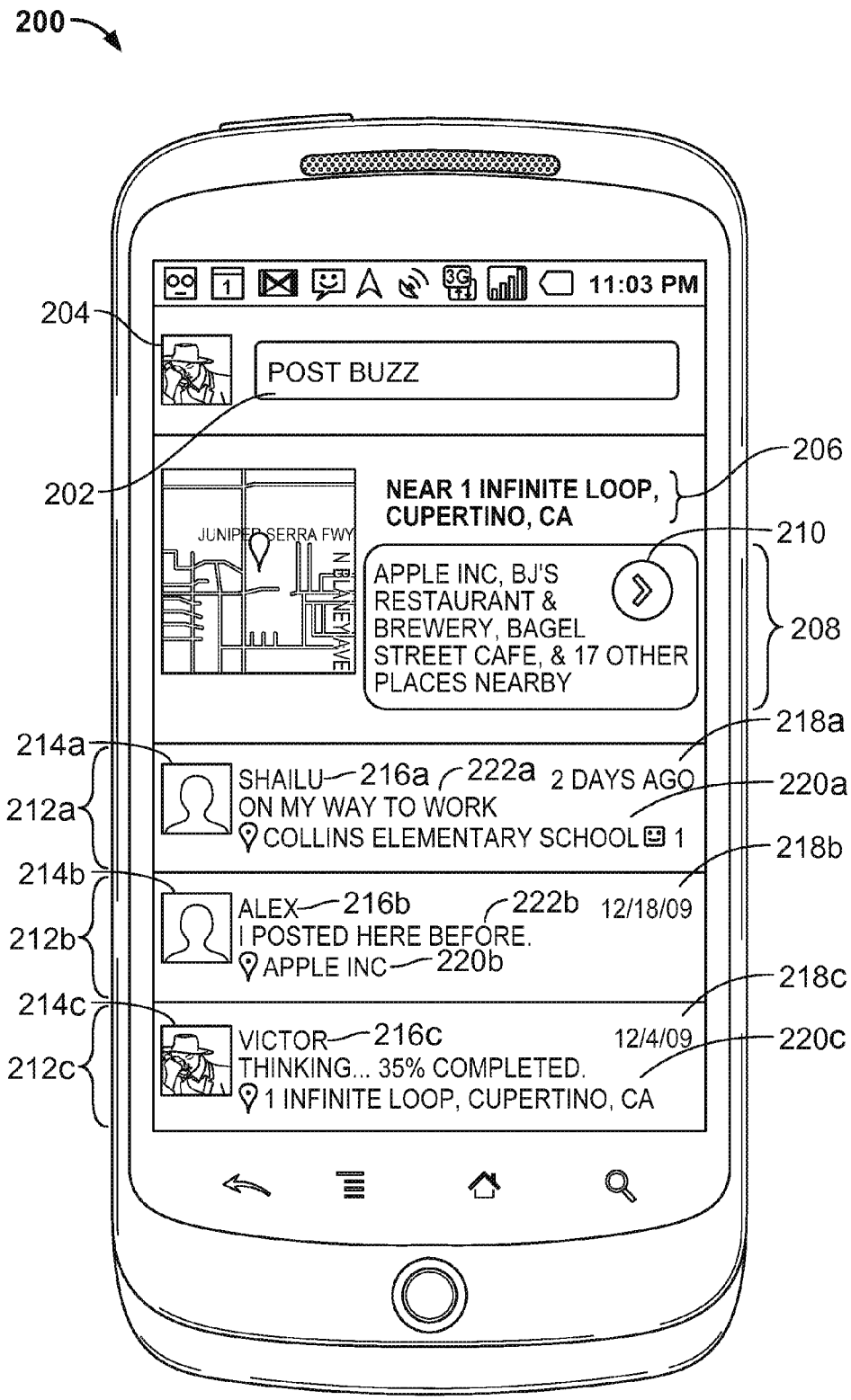
FIG. 2 is an illustration of a micro-blogging application invoked for display on a mobile telephone.

FIG. 2 is an illustration of a micro-blogging application invoked for display on a mobile telephone. The interface 200 can include a picture 204 of the user who is logged into the account, and an input box 202 for submitting posts that are associated with the user account. A present location 206 of the mobile computing device may be displayed in the interface 200. The present location may be determined by location-identification services (e.g., GPS, cellular identification, or Wi-Fi identification). The present location may be coordinates, an address, or a venue (e.g., a commercial business or public place). In some examples, the user can select his venue from a list of venues that are determined by a server system to be near an estimated geographical location of the mobile computing device.

The venues of interest box 208 can display a list of venues that may be near the mobile device's estimated geographical location. Selection of the expansion interface element 210 may invoke a display of detailed information for the venues of interest, or a display that enables selection of any of the venues of interest and subsequent display of detailed information (e.g., an address, map, hours of operation, website link).

The interface 200 may include a display of several posts 212*a-c*. Each post can include a picture of the poster 214*a-c*, a name of the poster 216*a-c*, a date of the post 218*a-c*, a place of posting 220*a-c*, and post content 222*a-c*. The post content may include a summary of original post content. Additional post content by the author, comments by other users, and other post content may be displayed in response to a selection of the post (e.g., by tapping on the post). In some examples, selection of the place of posting 220*a-c* invokes a display of the location of the place of posting (e.g., on a map). In some examples, the interface 200 for the application program may not be integrated with an email application (e.g., unlike interface 100).

Figure 3:
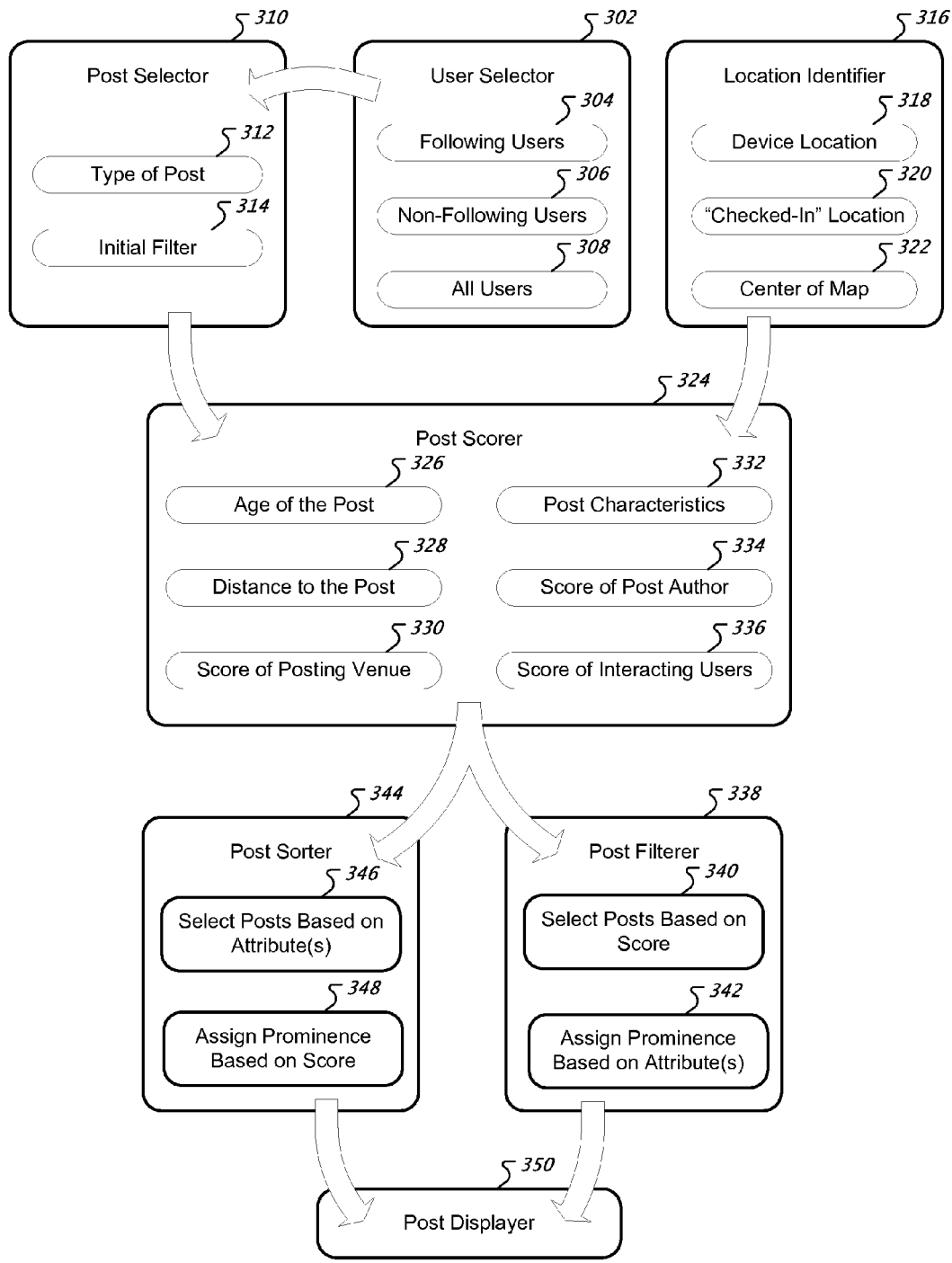
FIG. 3 is a block diagram of a system for determining message prominence.

FIG. 3 is a block diagram of a system for determining message prominence. In general, the system selects posts for display to a particular user of a messaging service. The system may operate in response to a request that the system select such posts for display to the particular user and assign a prominence to such posts. The user selector 302 selects a group of post authors. The post selector 310 selects a set of posts that were authored by the selected group of post authors. The post scorer 324 assigns a score to each of the selected posts based on various signals. The location identifier 316 determines a location of the user to which the posts may be displayed.

Figure 4A:
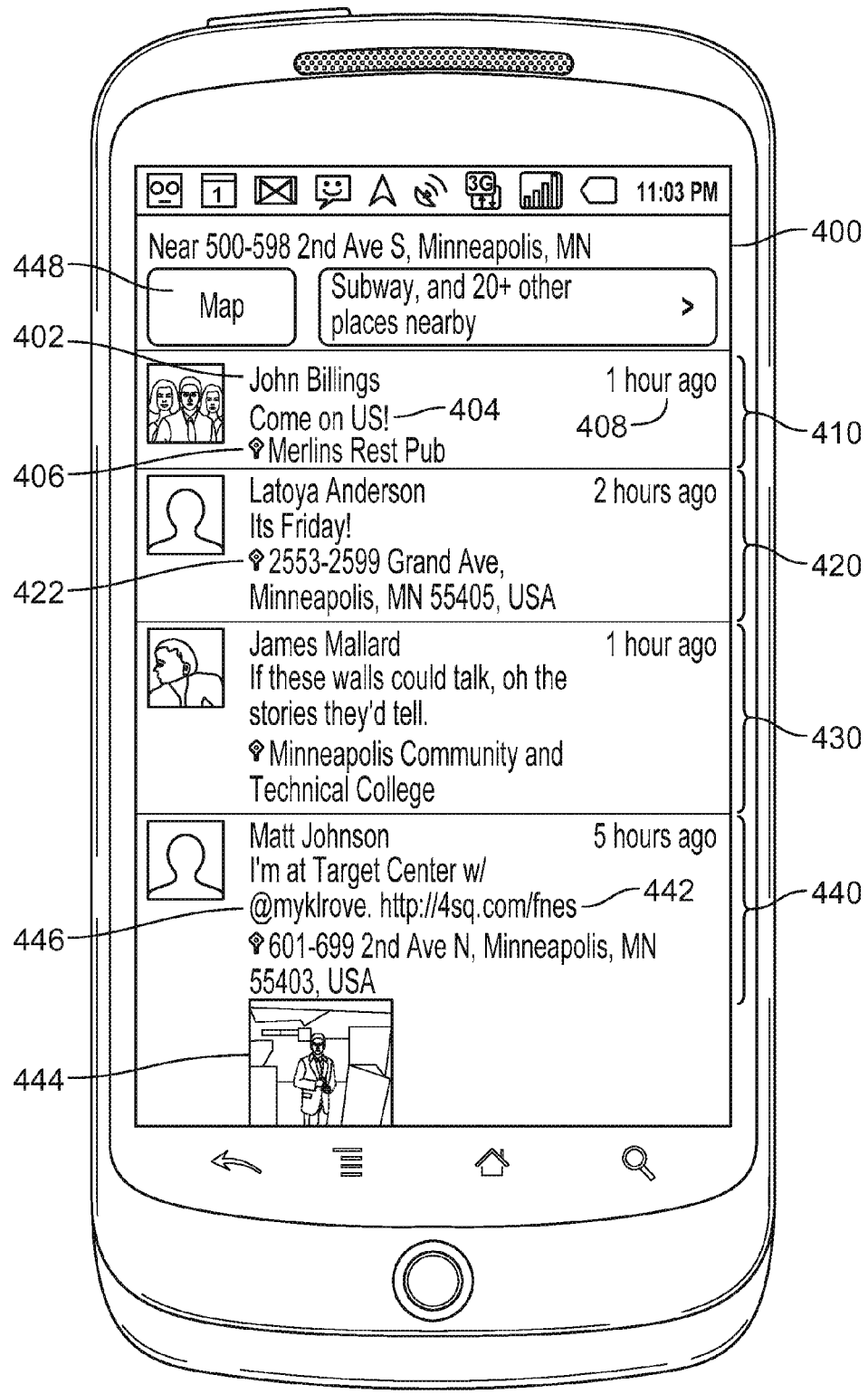
FIG. 4A is an example screenshot of a list of posts.
Figure 4B:
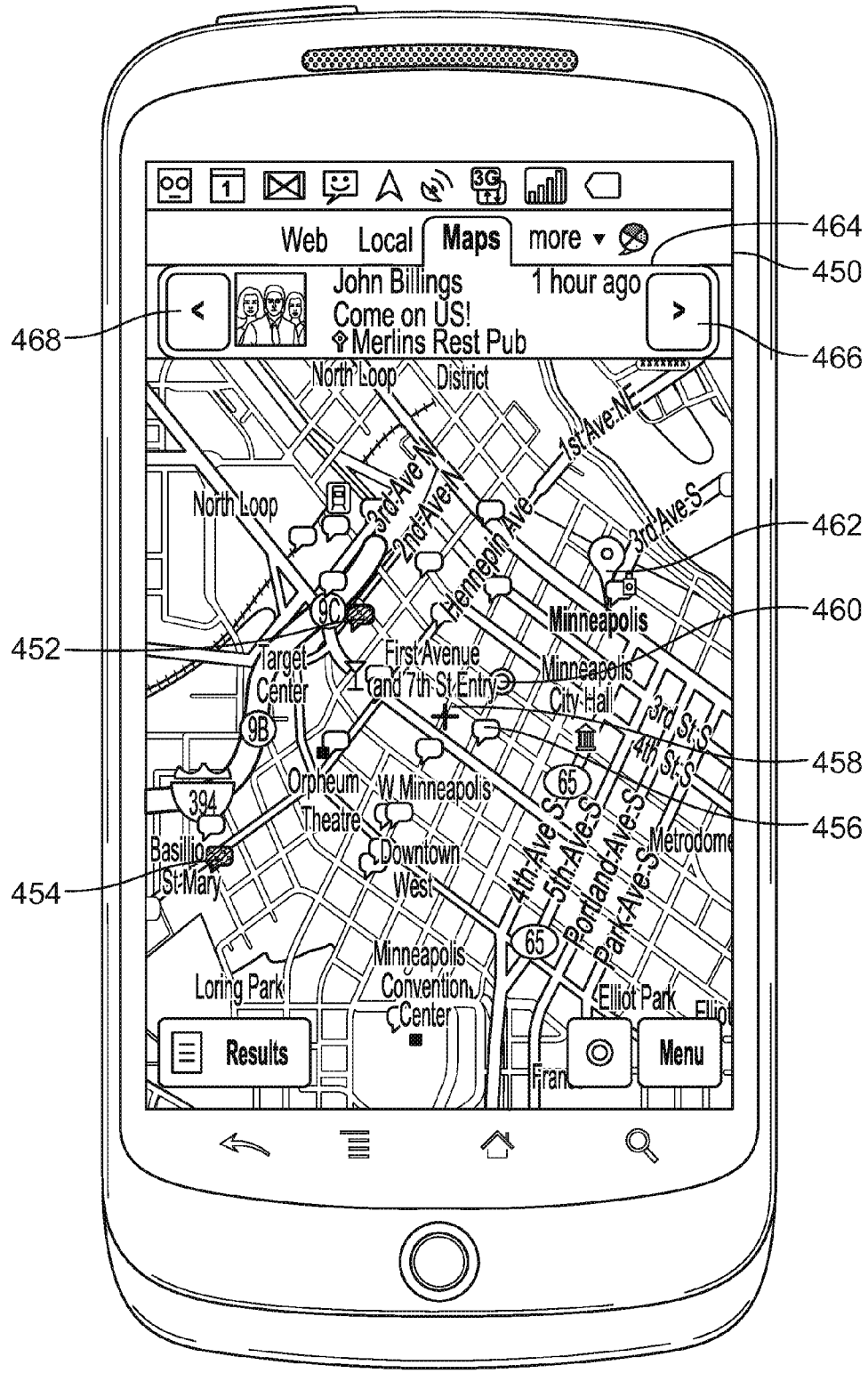
FIG. 4B is an example screenshot of a map that displays indications of posts.

The post sorter 344 sorts that posts so that a subset of high scoring posts are selected based on one or more attributes, and then the selected posts are assigned a prominence that is based on each post's score. Alternatively, the post filterer 338 filters the posts so that a subset of high-scoring posts are selected, and the selected posts are each assigned a prominence that is based on one or more attributes. The post displayer 350 performs operations for displaying to the particular user an indication of each of the selected posts, and an indication of each post's prominence (e.g., as illustrated in FIGS. 4A-B).

In more detail, the user selector 302 identifies a set of authoring users. For example, the identified set of users may be those users that the particular user "follows" (box 304). In another example, the identified set of users may be those users that the particular user does not follow (box 306). In yet another example, the identified set of users may be all users (e.g., both the users that the particular user has agreed to follow and the users that the particular user does not follow) (box 308). Thus, the user selector 302 identifies authors of posts that may be displayed to the particular user.

The post selector 310 selects a subset of the posts that were authored by the identified set of authoring users. In other words, the post selector 310 may act as a filter to reduce the universe of posts by the identified set of authoring users down to a more manageable level. The subset of posts may be selected based on a type of the posts (box 312). Example types of posts can include textual and multimedia posts that are authored by other users, posts that have been rebroadcast by other users, advertisements that have been rebroadcast by other users, pictures that have been posted by other users, videos that have been posted by other users, web pages that have been recommend by other users, and products that have been recommended by other users.

The sub-set of posts may be selected based on an initial filter (box 314). The initial filter may remove posts that satisfy specific criteria. For example, posts that have been determined to be spam may be removed. As another example, posts that are associated with a geographical location farther than fifty miles away from the particular user may be removed. As yet another example, posts that are older than five days may be removed.

The location identifier 316 identifies a location that is associated with the particular user who is to view the posts. In some examples, the identified location is an estimated geographical location of a particular device that is to display the selected posts (box 318). The estimated geographical location of the device may have been determined by the particular device using signals from space-based navigational satellites, triangulation of cellular tower signals, identification of source cellular towers of cellular signals, or identification of source Wi-Fi routers of Wi-Fi signals.

In some examples, the identified location is a venue at which the particular user has "Checked-In" (box 320). For example, the messaging service may allow a user to check-in at any given time to a single venue. When the user is checked-in to a venue, all of multiple posts that the user authors while checked-in may be tagged with the checked-in venue, without the user providing user input with each post to identify the venue. Thus, when such an authored post is displayed to recipient users, the checked-in venue may display with the post. Further, when a user of the messaging service views a list of her "friends," a "checked-in" venue for at least some of the friends may appear with the friends' names. A "checked-in" venue may be a venue that the user selects from a computer-generated directory of venues. In contrast, if a user has not checked-in to a venue, the user's location may be displayed as geographical coordinates or a street address.

In some examples, the location of the particular user may be identified as a center portion of a map that the particular user is viewing on a display device (box 322). For example, the particular user may request to view, on a map, a list of posts that were authored by other users of the messaging service. The location of the particular user may be identified as a center of the map, or a marker that is overlaid on the map, where the user can move the map to change a viewable portion of the map (and change a position of the center of the map or a marker that is overlaid on the map).

The post scorer 324 assigns a score to each of the selected posts. The score for each post may be based, at least in part, on any combination of an age of the post 326, a distance to the post 328, a score of a posting venue 330, characteristics of the post 332, a score of the post author 334, and a score of interacting users 336. For example, a default score for each post may be weighted or modified based on any combination of one or more of the signals 326-336. Each of the signals 326-336 and their application to a scoring of a post is described in more detail below.

The post score may be based on an age of the post 326. The age of the post 326 may be a difference between a time when the post was submitted to the messaging service and a time when the post scorer 324 is assigning a score to the post. In some examples, the age of the post 326 is explicitly stored or calculated. In some examples, the post scorer 324 access a value that identifies the time when the post was generated, and directly generates or modifies the score based on the time when the post was submitted (e.g., without explicitly calculating a numerical "age" of the post). The older a post the less prominent a score may be assigned to the post.

The post score may be based on the distance to the post 328. The distance to the post 328 is a representation of a geographical distance between a location of the particular user who is to view the post and a location where the post was authored from. The distance may be a numerical approximation of the geographical distance (e.g., a number 3.4 that represents 3.4 kilometers), or a value that is based on the geographical distance (e.g., a number 0.12 that is determined from a range of potential values between 0.0 and 1.0). The location of the user may be the location that is identified by the location identifier 316. The location where the post was authored from may have been determined using mechanisms that are similar to those described in relation to the location identifier 316 (but with respect to an author of the post).

The post score may be based on a score of a posting venue 330. For those instances where a post is associated with a venue at which a user "checked-in," a reputation of the venue may be used to positively or negatively impact the score of the post.

A score of a posting venue 330 may be based on user reviews (e.g., a rating provided by each reviewer and a number of the reviews). For example, users of the messaging service (or another service that can access a directory of the venues) can comment on the venues and rate the venues. As an illustration, a rating can include: (i) a selection of a "Like" button for the venue or for posts that were authored for the venue, (ii) user selections of "Thumbs up" or "Thumbs down" buttons, or (iii) user selections of a one to five star rating system. The higher-rated a venue, the higher a post that is submitted from the venue may be scored.

The score of a posting venue 330 may be based on an amount of "check-ins" at the venue by other users of the messaging service. For example, a venue may be highly scored if a large number of users have checked-in to the venue. In some examples, the score is based on a number of posts that are submitted by users that have checked-in to the venue. The number of check-ins or posts may be normalized based on a recent time period, so that if a particular venue is trending higher during a recent time period, posts that are submitted during the recent time period may be weighted either more heavily or less heavily when compared to a post that was submitted before the recent trend.

The score of the posting venue 330 may be based on an amount of "check-ins" or posts from the venue that are by the particular user to which posts are being selected for display. Thus, the score of the posting venue 330 may be calculated differently for each particular user of the messaging service. As an illustration, suppose that a user of the messaging service, Katie, posts from a local coffee shop two weeks ago. Posts that are authored by users that are checked-in to the coffee shop may be scored more highly for Katie (e.g., in response to a request by Katie's mobile telephone to display posts). The degree to which posts from a particular venue are weighted may be based on a quantity of Katie's "check-ins" at the location, and a recency of the "check-in." Thus, Katie may see less posts by users at the local coffee shop if she stops visiting the coffee shop.

The score of the posting venue 330 may be based on an amount of times that users have identified the venue as an explicit recipient of a post. For example, users may be able to view a list of posts that identified, within each post, the venue as an explicit recipient (e.g., an @replied recipient). The more that the venue is mentioned as an explicit recipient in posts, the higher a score for the venue.

The post score may be based on characteristics of the post. For example, posts that include multimedia content (e.g., a picture or a video) may be scored higher than posts that do not include a picture. Thus, when authors attach multimedia content to posts, these posts may be more likely to be viewed by other users of the messaging service. In some examples, posts that have more content (e.g., more alphanumeric characters) may be scored more highly than posts that include less content. In some examples, posts that include trending words or phrases may be scored more highly than posts that do not include trending words or phrases. In some examples, certain types of posts may be assigned a higher score (e.g., rebroadcast advertisements may be assigned a higher score than typical posts).

The post score may be based on a score of the author of the post 334. Thus, posts by authors that have a good reputation may be scored more highly than posts by authors that do not have a good reputation. In various examples, an author's reputation may be based on an amount of people that "Like" the author's posts, a number of people that "rebroadcast" the author's posts to other users, a number of "followers" that the author has, an aggregate score of the posts by the author (e.g., an average of scores for the author's posts, where the scores are based on post length and content of the posts), and a frequency of posting by the author.

In various examples, the author's score may be based, at least in part, on the score of authors that have decided to "follow" the author. Thus, if high-scoring authors follow a particular author, that particular author may in turn have a high score. Thus, an author's score may be based, in part, on a link analysis algorithm (e.g., a PAGERANK-style algorithm). A score of following users may be highly relevant because following users may have the author's posts appear as integrated into the following users' respective activity streams. Thus, an active user of the messaging service that has a good reputation may be unlikely to follow an author that submits poor quality posts or spam posts. The active user may not want to view on a daily basis poor quality posts, and may "unsubscribe" from users that submit low quality posts. Also, an author's score may also be assigned based on a social network distance to the author (as described in more detail below).

The post score may be based on a score of interacting users 336. Interacting users may be those users that have commented on a particular post, "liked" a particular post, or rebroadcast a particular post to other users of the messaging service. In various examples, the impact of each interacting user may be based on: (i) a type of interaction, and (ii) a social network distance between the interacting user and the particular user for whom the post is being scored for possible display.

A social network distance may be based on a number of relationships between the two users (e.g., whether the users are "friends" or "friends of friends"), and a strength of the relationships. A relationship may be formed between users of the messaging service when one of the users agrees to "follow" the other user. Relationships may also be formed when a user comments on or likes a post by another user. The strength of the relationships may be based on whether the users follow each other (as opposed to one-way following), and a quantity of times that the users comment on, view, like, and rebroadcast each other's posts.

In various examples, multiple of the signals 326-336 may be used to generate a single score for a post. For example, the age of the post and the distance to the post may both be used to modify a score that is used by the post sorter 344 or the post filterer 338.

The post sorter 344 may receive a set of posts that were scored by the post scorer, and output a potentially smaller set of posts that have been assigned a prominence that is based on the score. As an illustration, the post sorter 344 may receive information identifying one thousand posts that were scored by the post scorer. The post sorter 344 may select a subset of the ten highest scoring posts (box 346). In some examples, the subset is selected based on the score. In other examples, the subset is selected based on a criteria that is different than the score (e.g., one or more of the attributes 326-336).

In various examples, each of the posts in the smaller set may be assigned a prominence that is based on the score (box 348). For example, although the ten highest scoring posts may have specific scores (e.g., 5.24), the post sorter 344 may assign each of the ten posts a numerical ranking between one and ten, based on the posts' scores. In another example, the posts are assigned a prominence that is shared among multiple posts. For example, half of the posts may be assigned a "high" prominence based on their scores, while the other half may be assigned a "low" prominence based on their scores. The posts and indications of their prominence may be transmitted to the post displayer 350. In various examples, the post displayer does not receive the scores for each of the posts in the subset.

The post filterer 338 may receive a set of posts that were scored by the post scorer, and output a smaller set of posts that have been selected based on post scores. The output posts may be assigned a prominence using a criteria that may be different than the score. As an illustration, the post falterer 338 may receive information identifying one thousand posts that were scored by the post scorer. The post filterer 338 may select a subset of the ten posts with the highest scores, as determined by the post scorer 324 (box 340). The subset of posts may be assigned a prominence (e.g., a ranking or category of prominence) based on one or more attributes (box 342). For example, although the score is used to select the subset of ten posts, the posts may be sorted and assigned a respective ranking based only on an age of each of the posts or a distance to each of the subset of posts. The posts and indications of their prominence may be transferred to the post displayer 350. In various examples, the post displayer does not receive the scores for each of the posts in the subset.

The post displayer 350 may receive a set of posts and an indication of prominence for each of the posts, and perform operations to display on a computing device an indication of each of the set of posts and a visual indication of a prominence of each of the posts. The post displayer 350 may include a component that is at a server system that is hosted by the messaging system in order to transmit the posts and the indications of prominence over a network and to the computing device that is to display the indications of the posts. The post displayer 350 may also include a component that is at the computing device in order to display the indications of the posts, and the indications of post prominence. In some examples, all the components illustrated in FIG. 3 are located on a server system. In some examples, the components are located, in whole or in part, on the computing device that is to display the posts.

FIG. 4A is an example screenshot of a list of posts. The screenshot 400 illustrates a display of vertically stacked posts. As an illustration, a user of the messaging service, Katie, may access on her mobile telephone an application that allows her to view a list of posts by other users of the messaging service. The application displays a list of posts 410, 420, 430, and 440. Each of the posts includes a name of a posting author 402, a content of the post 404, an age of the post 408, and a posting location 406. In this illustration, the posting location of the top post 410 is a venue "Merlins Rest Pub." Thus, the author of the top post 410 may have "checked-in" to "Merilins Rest Pub" before submitting the post "Come on US!." On the other hand, the second-to-top post 420 includes a range of street addresses "2553-2599 Grand Ave, Minneapolis, MN 45405, USA" as a place of posting. Thus, the author of the second-to-top post 420 may not have "checked-in" to a place of posting, and the posting location 422 may be an estimated geographical location of the author's mobile device.

Each of the posts 410, 420, 430, and 440 may be arranged in an order according to a score that is assigned to each of the posts. For example, a server system that hosts the messaging service may determine a score for each of the posts 410, 420, 430, and 440. The server system may transmit to the mobile computing device: (i) information sufficient to generate a display of the posts 410, 420, 430, and 440, and (ii) an indication of the scores (e.g., the scores, a ranking of the posts, or an ordering of transmission of the posts). The mobile computing device may visually display an indication of the posts' ranking. In this illustration, the visual indication of ranking includes placing a highest ranked post at a top of the list, a second highest ranked post second-to-top, etc.

The posts in this example are displayed in a sorted order that is based at least in part on both time and distance. For example, and as illustrated by the age 408 of the posts, the posts are not merely sorted in a chronological order. Further, the posts may not be sorted merely based on distance, as the post by James 430 may be closest to a location of the mobile telephone.

In various examples, the scores that are assigned to each of the posts 410, 420, 430, and 440 may be based at least in part on content of the posts, as described throughout this document. For example, the post by Matt may be assigned a more prominent score because the post includes a picture 444, a link 442, or an @reply to another user 446. Thus, the post may be displayed fourth-most prominently, even though the post is five hours old and posts there may be non-displayed posts that were authored three hours ago.

In various examples, a prominence of a post may be indicated by a shading or color of the post or a portion therein, an icon that is associated with the post, or a size of the post.

FIG. 4B is an example screenshot of a map that displays indications of posts. The map screenshot 450 may be displayed in response to a user selection of the "Map" graphical interface element 448 that is illustrated in FIG. 4A. The map may display indications of multiple posts, for example, the indications of posts 452, 454, and 456 (hereinafter referred to as posts). The posts may be user-selectable graphical interface elements. User selection of a post may cause information for the post to appear in a dialog box or a different screen (e.g., the information displayed for post 510 in FIG. 4A may appear in a "bubble"). The set of posts that is displayed with the map and to the user may be the posts that are selected, for example, by the sort filterer in box 346.

The posts that are displayed in the map may have different icons associated with the posts based on a prominence of the posts. For example, the posts 452 and 454 are shaded a different color than post 456. Each post may be assigned a type of icon based on an indication of a score for the posts that is transmitted to the computing device by a server system. For example, the server system may determine a score for each of the posts that are represented by an icon in the screenshot 450. Those posts that are associated with a score above a predetermined threshold may be assigned a first indication of the posts' score (e.g., a number 1) while those posts that are associated with a score below the threshold may be assigned a second indication of the posts' score (e.g., a number 2). The indications of posts' scores may be transmitted to the computing device, which selects an icon to display for the posts based on each post's indication of score. The icons may be displayed on the map at an estimated geographical position of the associated posts' authoring.

At a top of the screenshot 450 is a toolbar for displaying content for a single post at a time. The toolbar 464 may be configured to navigate through a sequence of posts. In some examples, indications of post scores may be used to define an order of display for the posts in the sequence. For example, selection of the right arrow graphical interface element 466 may cause a next-highest ranked post (e.g., the post 520) to display in a central window of the toolbar 464. In various examples, posts may be displayed one at a time in a sequence without a display of the map in the background.

As described throughout this document, a location of the computing device may be determined in multiple different manners. In some examples, the location of the computing device is based on the center of the map (e.g., as indicated by the cross-hatch graphical interface element 458). In other examples, the location of the computing device is based on an estimated geographical location of the computing device, for example, as determined using a geographical positioning system. The estimated geographical location of the computing device may be designated by a sphere icon 460. In yet other examples, the location of the computing device may be based on a location at which a user of the computing device has "checked-in." A "checked-in" location may be identified by the "Marker" 462.

Figure 5:
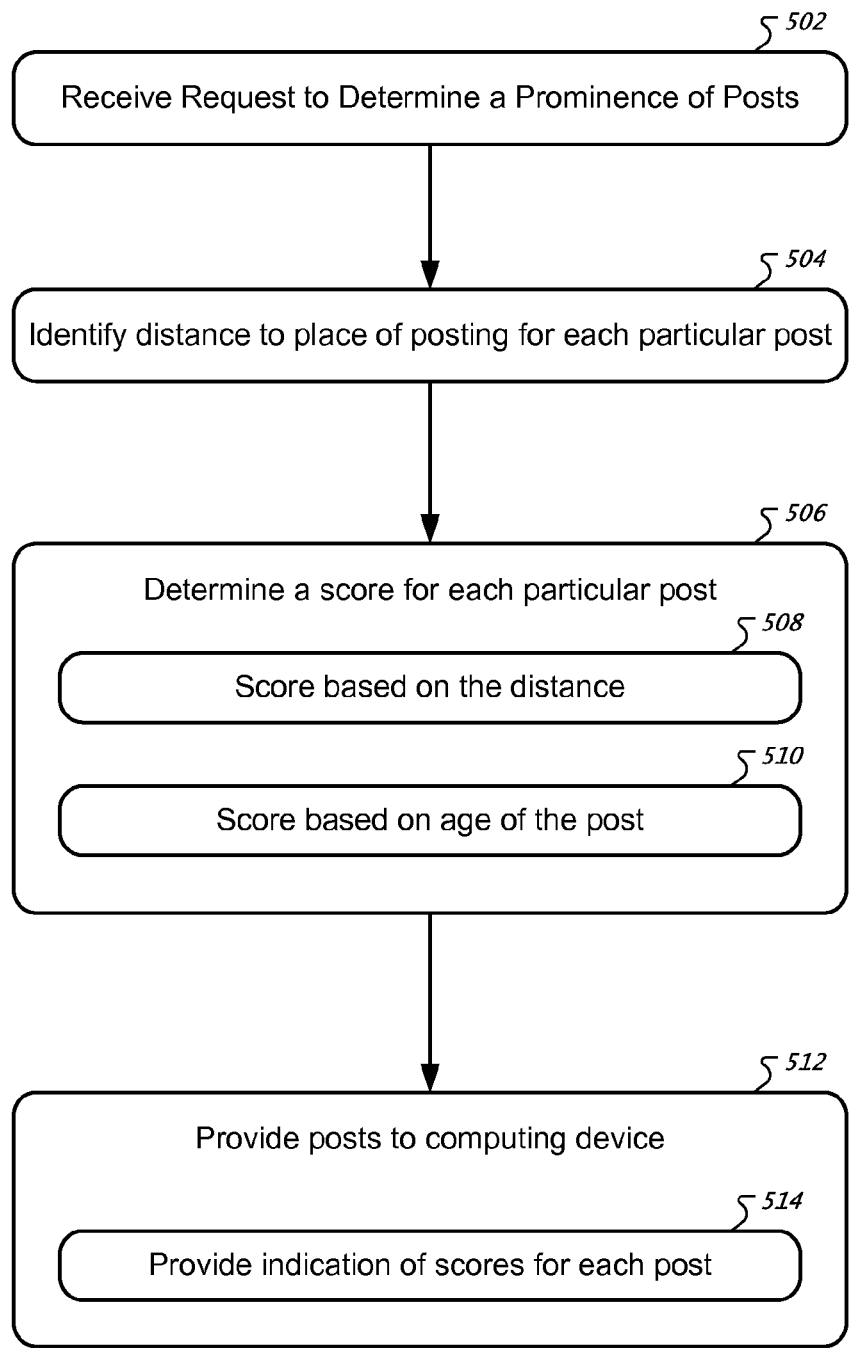
FIG. 5 is a flowchart of a process for determining message prominence based on post age and location.

FIG. 5 is a flowchart of a process for determining message prominence based on post age and location. The process may be performed by the systems described throughout this document, for example, the system of FIG. 3.

In box 502, a request is received to determine a prominence of posts. For example, a user of the mobile telephone enters a Uniform Resource Locator (URL) for a website of a messaging service. In response entering the URL, the mobile telephone transmits a request to a server system to return resources that are responsive to the URL. The server receives the request for resources, and in response, issues a request that a selection of posts be scored and provided to the mobile telephone.

In box 504, a distance to a place of posting for each particular post is identified. For example, a distance between an estimated geographical location of the mobile telephone (or a location at which a user of the mobile telephone has "checked-in") and a location to a device that was used to author a particular post is identified. The distance may be represented as an alphanumeric variable representing proximity of the posting location to the user.

In box 506, a score for each particular post is determined. The score may be based both on the distance (box 508) and on the age of the (post 510). The age of the post may be a period of time that has elapsed since the post was authored. An example function that that is used to determine the score follows:

$$\text{Score} = \frac{1}{\text{Max}(100, \text{distance}) * \text{Max}(4 * 3600, \text{age})}$$

The distance may be represented in meters and the age may be represented in seconds. The left-most Max function may return a greater of the value 100 or a value of the "distance" variable. The right-most Max function may return a greater of the value 4*3600 or a value of the "age" variable. Thus, a value of 50 may not be used for the distance value, and value of 200 may not be used for the age value. These lower-thresholds for the distance and age variables helps prevent excessive bias for very recent posts, or posts that were posted from very close locations.

In some examples, the distance and age components may be assigned a weight, for example, so that distance is favored more heavily than age. An example function that includes the weighting variables "distanceboost" and "ageboost" follows:

$$\text{Score} = \left(1 + \frac{\text{distanceboost}}{\text{Max}(100, \text{distance})}\right) * \left(1 + \frac{\text{ageboost}}{\text{Max}(4 * 3600, \text{age})}\right)$$

The use of the "distanceboost" and "ageboost" variables allows adjustment of the relative importance of the age and distance in the final score (and effectively the mix of items that are presented to a user). Age and distance may be weighted so that a 10 minute old post that is very far away is scored similarly to a 5000 meter away post that is a second old.

A prominence of each of the posts, as to be displayed to a user, can be determined based on a space-time distance to each of the posts. As an illustration, in a two-dimensional graph where time is plotted on a first axis and distance is plotted on a second axis, posts may be graphed so as to have both time and distance components. A space-time distance to the post may be a distance from the origin of the graph to a "dot" that represents the space-time representation of the post. The scale of each axis may be determined by the "distanceboost" and "ageboost" variables.

In box 512, the posts are provided to a computing device. For example, a server system may return the content of the posts to the mobile telephone that requested resources for the messaging service. The server system may also provide to the mobile telephone indications of scores for each post (box 514). For example, the server system may place on a network the scores for each of the posts, or abstractions of the scores (e.g., a ranking for each of the posts or a category to which each of the posts has been assigned). The providing of the posts may cause the computing device to display the posts or indications of the post, for example, as in FIGS. 4A-B.

Figure 6:
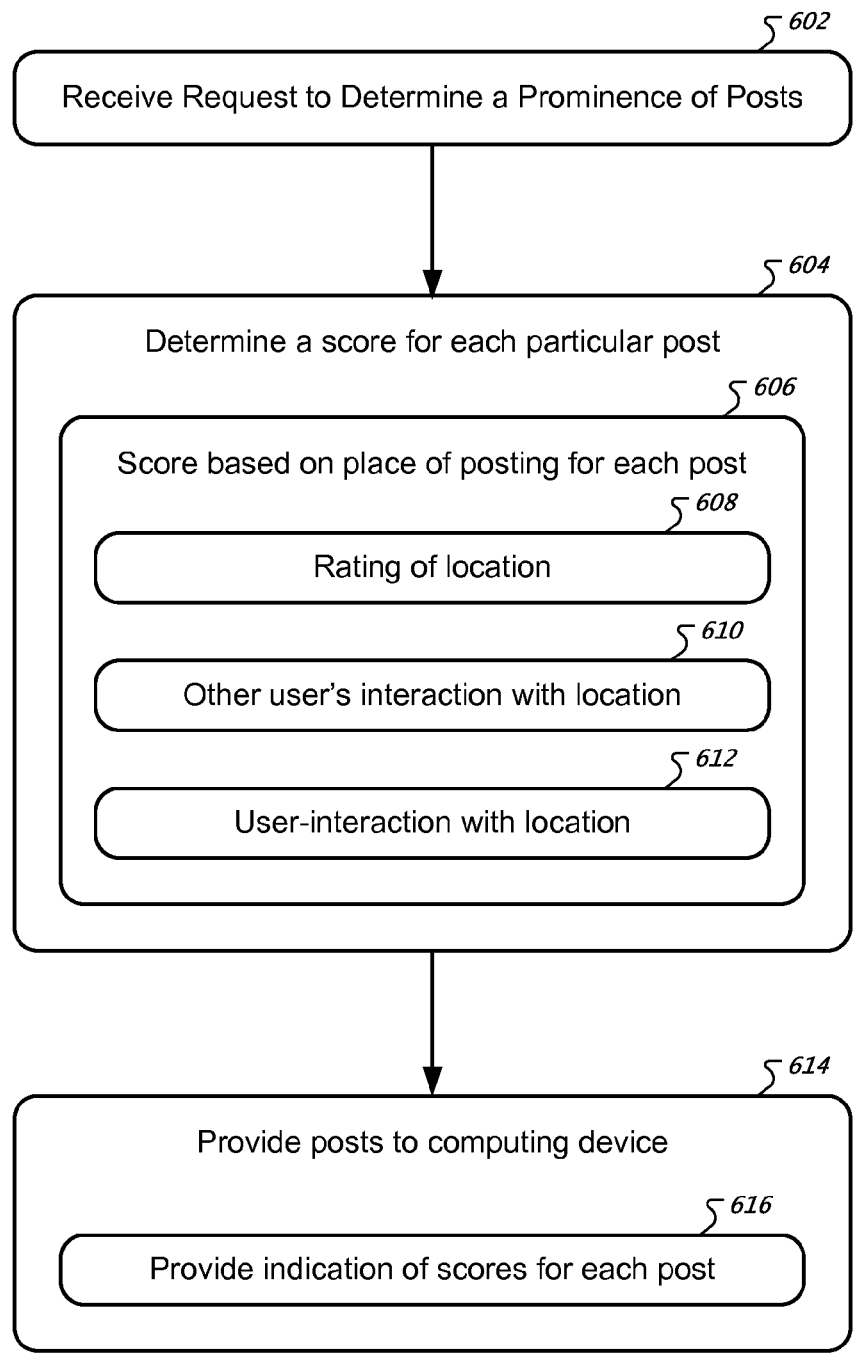
FIG. 6 is a flowchart of a process for determining message prominence based on posting location score.

FIG. 6 is a flowchart of a process for determining message prominence based on posting location score. The process may be performed by the systems described throughout this document, for example, the system of FIG. 3. In box 602, a request to determine a prominence of posts is received, for example, as described in box 502.

In box 604, a score for each particular post that is displayed to be displayed to the user is determined. One or more of the posts may be associated with a place of posting. The score for each particular post may be based on a score for the place of posting. The place of posting can be an estimated geographical location of the computing device, or a location at which a user of the computing device explicitly "checked-in."

The score can be based on a rating of the location, for example, an average rating between one and five stars that has been assigned by multiple users (box 608). The score can be based on other user's interaction with the location (box 610). For example, other users of the social network may have taken their mobile computing devices near the location, may have checked into the location, or may have posted from the location. The more frequent such interaction occurs, the higher score a location may have. The score can also be based on interaction with the location by the user of the mobile telephone that is to display the post (box 612), For example, the user of the mobile telephone may have walked into a coffee shop, "checked-in" to the coffee shop, or posted from the coffee shop. Thus, the coffee shop may be scored highly for a user of the mobile telephone, and posts that are associated with the coffee shop may be scored highly. In some examples, posts receive a higher score—all other things being equal—if the post was associated with a location at which a user "checked in," as opposed to a post that is not associated with a location, or is associated with an estimated geographical location.

In box 614, the posts may be provided to the computing device, along with indications of scores for each of the posts (box 616), as described in boxes 512 and 514.

Figure 7:
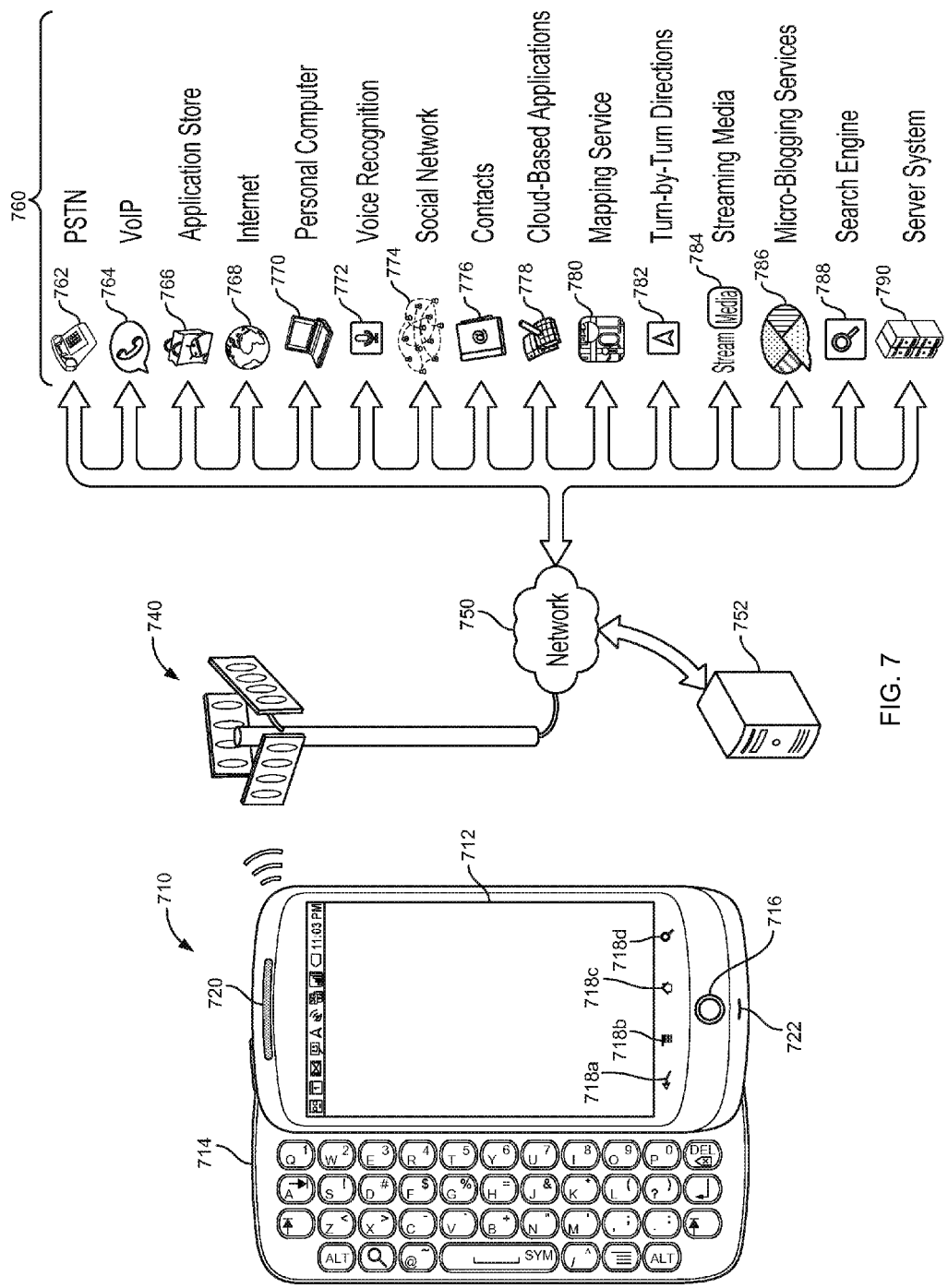
FIG. 7 is a conceptual diagram of a system that may be used to implement the systems and methods described in this document.

Referring now to FIG. 7, a conceptual diagram of a system that may be used to implement the systems and methods described in this document is illustrated. Mobile computing device 710 can wirelessly communicate with base station 740, which can provide the mobile computing device wireless access to numerous services 760 through a network 750.

In this illustration, the mobile computing device 710 is depicted as a handheld mobile telephone (e.g., a smartphone or an application telephone) that includes a touchscreen display device 712 for presenting content to a user of the mobile computing device 710. The mobile computing device 710 includes various input devices (e.g., keyboard 714 and touchscreen display device 712) for receiving user input that influences the operation of the mobile computing device 710. In further implementations, the mobile computing device 710 may be a laptop computer, a tablet computer, a personal digital assistant, an embedded system (e.g., a car navigation system), a desktop computer, or a computerized workstation.

The mobile computing device 710 may include various visual, auditory, and tactile user output mechanisms. An example visual output mechanism is display device 712, which can visually display video, graphics, images, and text that combine to provide a visible user interface. For example, the display device 712 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 712). Further, the mobile computing device 710 may include one or more speakers 720 that convert an electrical signal into sound, for example, music, an audible alert, or voice of an individual in a telephone call.

An example mechanism for receiving user input includes keyboard 714, which may be a full qwerty keyboard or a traditional keypad that includes keys for the digits '0-9', 'k', and '#.' The keyboard 714 receives input when a user physically contacts or depresses a keyboard key. User manipulation of a trackball 716 or interaction with a trackpad enables the user to supply directional and rate of rotation information to the mobile computing device 710 (e.g., to manipulate a position of a cursor on the display device 712).

The mobile computing device 710 may be able to determine a position of physical contact with the touchscreen display device 712 (e.g., a position of contact by a finger or a stylus). Using the touchscreen 712, various "virtual" input mechanisms may be produced, where a user interacts with a graphical user interface element depicted on the touchscreen 712 by contacting the graphical user interface element. An example of a "virtual" input mechanism is a "software keyboard," where a keyboard is displayed on the touchscreen and a user selects keys by pressing a region of the touchscreen 712 that corresponds to each key.

The mobile computing device 710 may include mechanical or touch sensitive buttons 718a-d. Additionally, the mobile computing device may include buttons for adjusting volume output by the one or more speakers 720, and a button for turning the mobile computing device on or off. A microphone 722 allows the mobile computing device 710 to convert audible sounds into an electrical signal that may be digitally encoded and stored in computer-readable memory, or transmitted to another computing device. The mobile computing device 710 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software, Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 710 may present a graphical user interface with the touchscreen 712. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user input. For example, a user may select a graphical interface element by pressing a region of the touchscreen that corresponds to a display of the graphical interface element. In some examples, the user may manipulate a trackball to highlight a single graphical interface element as having focus. User selection of a graphical interface element may invoke a pre-defined action by the mobile computing device. In some examples, selectable graphical interface elements further or alternatively correspond to a button on the keyboard 704. User selection of the button may invoke the pre-defined action.

In some examples, the operating system provides a "desktop" user interface that is displayed upon turning on the mobile computing device 710, activating the mobile computing device 710 from a sleep state, upon "unlocking" the mobile computing device 710, or upon receiving user selection of the "home" button 718c. The desktop graphical interface may display several icons that, when selected with user input, invoke corresponding application programs. An invoked application program may present a graphical interface that replaces the desktop graphical interface until the application program terminates or is hidden from view.

User input may manipulate a sequence of mobile computing device 710 operations. For example, a single-action user input (e.g., a single tap of the touchscreen, swipe across the touchscreen, contact with a button, or combination of these at a same time) may invoke an operation that changes a display of the user interface. Without the user input, the user interface may not have changed at a particular time. For example, a multi-touch user input with the touchscreen 712 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user input within the portion of the desktop.

The mobile computing device 710 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 710 may include other application modules and hardware. A call handling unit may receive an indication of an incoming telephone call and provide a user capabilities to answer the incoming telephone call.

A media player may allow a user to listen to music or play movies that are stored in local memory of the mobile computing device 710. The mobile telephone 710 may include a digital camera sensor, and corresponding image and video capture and editing software. An internet browser may enable the user to view content from a web page by typing in an addresses corresponding to the web page or selecting a link to the web page.

The mobile computing device 710 may include an antenna to wirelessly communicate information with the base station 740. The base station 740 may be one of many base stations in a collection of base stations (e.g., a mobile telephone cellular network) that enables the mobile computing device 710 to maintain communication with a network 750 as the mobile computing device is geographically moved. The computing device 710 may alternatively or additionally communicate with the network 750 through a Wi-Fi router or a wired connection (e.g., Ethernet, USB, or FIREWIRE). The computing device 710 may also wirelessly communicate with other computing devices using BLUETOOTH protocols, or may employ an ad-hoc wireless network.

A service provider that operates the network of base stations may connect the mobile computing device 710 to the network 750 to enable communication between the mobile computing device 710 and other computerized devices that provide services 760. Although the services 760 may be provided over different networks (e.g., the service provider's internal network, the Public Switched Telephone Network, and the Internet), network 750 is illustrated as a single network. The service provider may operate a server system 752 that routes information packets and voice data between the mobile computing device 710 and computing devices associated with the services 760.

The network 750 may connect the mobile computing device 710 to the Public Switched Telephone Network (PSTN) 762 in order to establish voice or fax communication between the mobile computing device 710 and another computing device. For example, the service provider server system 752 may receive an indication from the PSTN 762 of an incoming call for the mobile computing device 710. Conversely, the mobile computing device 710 may send a communication to the service provider server system 752 initiating a telephone call with a telephone number that is associated with a device accessible through the PSTN 762.

The network 750 may connect the mobile computing device 710 with a Voice over Internet Protocol (VoIP) service 764 that routes voice communications over an IP network, as opposed to the PSTN. For example, a user of the mobile computing device 710 may invoke a VoIP application and initiate a call using the program. The service provider server system 752 may forward voice data from the call to a VoIP service, which may route the call over the internet to a corresponding computing device, potentially using the PSTN for a final leg of the connection.

An application store 766 may provide a user of the mobile computing device 710 the ability to browse a list of remotely stored application programs that the user may download over the network 750 and install on the mobile computing device 710. The application store 766 may serve as a repository of applications developed by third-party application developers. An application program that is installed on the mobile computing device 710 may be able to communicate over the network 750 with server systems that are designated for the application program. For example, a VoIP application program may be downloaded from the Application Store 766, enabling the user to communicate with the VoIP service 764.

The mobile computing device 710 may access content on the Internet 768 through network 750. For example, a user of the mobile computing device 710 may invoke a web browser application that requests data from remote computing devices that are accessible at designated universal resource locations. In various examples, some of the services 760 are accessible over the internet.

The mobile computing device may communicate with a personal computer 770. For example, the personal computer 770 may be the home computer for a user of the mobile computing device 710. Thus, the user may be able to stream media from his personal computer 770. The user may also view the file structure of his personal computer 770, and transmit selected documents between the computerized devices.

A voice recognition service 772 may receive voice communication data recorded with the mobile computing device's microphone 722, and translate the voice communication into corresponding textual data. In some examples, the translated text is provided to a search engine as a web query, and responsive search engine search results are transmitted to the mobile computing device 710.

The mobile computing device 710 may communicate with a social network 774. The social network may include numerous members, some of which have agreed to be related as acquaintances. Application programs on the mobile computing device 710 may access the social network 774 to retrieve information based on the acquaintances of the user of the mobile computing device. For example, an "address book" application program may retrieve telephone numbers for the user's acquaintances. In various examples, content may be delivered to the mobile computing device 710 based on social network distances from the user to other members. For example, advertisement and news article content may be selected for the user based on a level of interaction with such content by members that are "close" to the user (e.g., members that are "friends" or "friends of friends").

The mobile computing device 710 may access a personal set of contacts 776 through network 750. Each contact may identify an individual and include information about that individual (e.g., a phone number, an email address, and a birthday). Because the set of contacts is hosted remotely to the mobile computing device 710, the user may access and maintain the contacts 776 across several devices as a common set of contacts.

The mobile computing device 710 may access cloud-based application programs 778. Cloud-computing provides application programs (e.g., a word processor or an email program) that are hosted remotely from the mobile computing device 710, and may be accessed by the device 710 using a web browser or a dedicated program. Example cloud-based application programs include GOOGLE DOCS word processor and spreadsheet service, GOOGLE GMAIL webmail service, and PICASA picture manager.

Mapping service 780 can provide the mobile computing device 710 with street maps, route planning information, and satellite images. An example mapping service is GOOGLE MAPS. The mapping service 780 may also receive queries and return location-specific results. For example, the mobile computing device 710 may send an estimated location of the mobile computing device and a user-entered query for "pizza places" to the mapping service 780. The mapping service 780 may return a street map with "markers" superimposed on the map that identify geographical locations of nearby "pizza places."

Turn-by-turn service 782 may provide the mobile computing device 710 with turn-by-turn directions to a user-supplied destination. For example, the turn-by-turn service 782 may stream to device 710 a street-level view of an estimated location of the device, along with data for providing audio commands and superimposing arrows that direct a user of the device 710 to the destination.

Various forms of streaming media 784 may be requested by the mobile computing device 710. For example, computing device 710 may request a stream for a pre-recorded video file, a live television program, or a live radio program. Example services that provide streaming media include YOUTUBE and PANDORA.

A micro-blogging service 786 may receive from the mobile computing device 710 a user input post that does not identify recipients of the post. The micro-blogging service 786 may disseminate the post to other members of the micro-blogging service 786 that agreed to subscribe to the user.

A search engine 788 may receive user-entered textual or verbal queries from the mobile computing device 710, determine a set of internet-accessible documents that are responsive to the query, and provide to the device 710 information to display a list of search results for the responsive documents. In examples where a verbal query is received, the voice recognition service 772 may translate the received audio into a textual query that is sent to the search engine.

These and other services may be implemented in a server system 790. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network, but may not include the second device receiving the data. Conversely, "receiving" from a first device may include receiving the data from a network, but may not include the first device transmitting the data.

Figure 8:
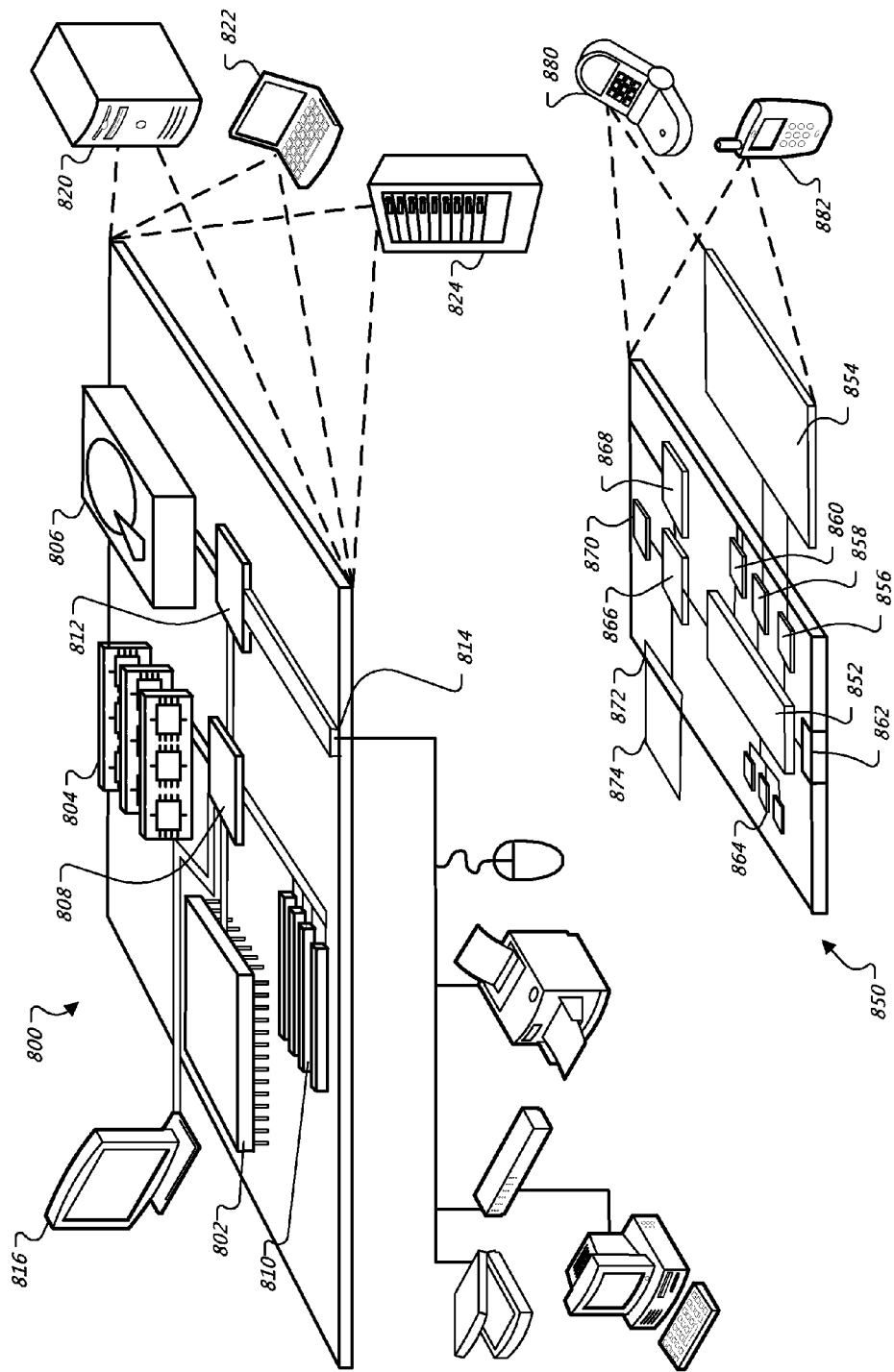
FIG. 8 is a block diagram of computing devices that may be used to implement the systems and methods described in this document, as either a client or as a server or plurality of servers.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus

814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, at a server system and from a computing device that is remote from the server system, a request that the server system deliver to the computing device textual posts that a plurality of authors have submitted to a messaging system, each particular post of at least some of the posts being associated with a geographical place of posting from which the particular post is determined to have been authored;
identifying, by the server system and for each particular post, a value that represents a geographical distance from a location that is associated with the computing device to the geographical place of posting for the particular post;
determining, by the server system and for each particular post, a score for the particular post, the score being based on at least the value that represents the geographical distance to the geographical place of posting for the particular post and whether the geographical distance meets a threshold; and
providing, by the server system and to the computing device for each particular post, an indication of the score for the particular post, so as to cause the computing device to display an indication of each particular post and visibly indicate a prominence of each particular post, the indication of prominence of each particular post being based at least in part on the indication of the score for each particular post, at least two of the particular posts, including a first post and a second post, having different visible indications of prominence based at least in part on the at least two particular posts having different indications of scores, the first and second posts being displayed by the computing device in first and second positions, respectively, based at least in part on the different indications of scores between the posts.

2. The computer-implemented method of claim 1, wherein the request that is received at the server system is initiated by user input at the computing device.

3. The computer-implemented method of claim 1, wherein each author of the particular posts did not identify post recipients in the respective particular posts, and wherein a user of the messaging system views posts, at least in part, by subscribing to an author so that the server system routes the author's posts to the user, or by the user requesting to view posts that the server system determines are recent and that are geographically relevant to a location that is associated with the user.

4. The computer-implemented method of claim 1, wherein the location that is associated with the computing device is an estimated geographical location of the computing device as determined using wireless signals that are received from multiple space-based global navigation satellites.

5. The computer-implemented method of claim 1, wherein the location that is associated with the computing device is a venue that a specific user of the computing device has identified as a posting location, wherein an identification of the venue is visibly displayed to other users of the messaging system that receive specific posts by the specific user while the venue is identified as a posting location.

6. The computer-implemented method of claim 1, wherein the geographical place of posting for each particular post is an estimated geographical location of a particular computing device that was used to author the particular post, as determined by the particular computing device by triangulating wireless signals from transmitting devices.

7. The computer-implemented method of claim 1, wherein the geographical place of posting for each particular post is a venue that an author of the particular post identified with user input as a posting location.

8. The computer-implemented method of claim 7, wherein the score for the particular post is further based at least in part on a score of the venue that the author of the particular post identified as being the posting location.

9. The computer-implemented method of claim 8 wherein, the score of the venue is based at least in part on a quantity of users of the messaging system that have identified the venue as a posting location.

10. The computer-implemented method of claim 8, wherein the score of the venue is based at least in part on a quantity of times that a user of the computing device to whom the indications of the posts are to be displayed has identified the venue as a posting location.

11. The computer-implemented method of claim 8, wherein the score of the venue is based at least in part on a plurality of user-supplied ratings for the venue.

12. The computer-implemented method of claim 8, wherein the score of the venue is based at least in part on a quantity of times that the venue has been identified in posts that were submitted to the messaging system as by a user input content portion of the post.

13. A computer-implemented method, the method comprising:
   determining, by a mobile computing device, a location that is associated with the mobile computing device;
   receiving, at the mobile computing device, user input for causing the mobile computing device to display indications of textual posts that a plurality of authors have submitted to a messaging service;
   submitting, by the mobile computing device and to a server system, a request for the posts and the location that is associated with the mobile computing device;
   receiving, at the mobile computing device and from the server system, for each particular post of at least a plurality of the posts, an indication of a prominence of the particular post, the received indication of prominence having been determined by the server system for each particular post based at least in part on a distance between the location that is associated with the mobile computing device and a location that is associated with the particular post and whether the geographical distance meets a threshold; and
   displaying, by the mobile computing device, an indication of each particular post and the indication of the prominence for each particular post, at least two of the particular posts, including a first post and a second post, having different displayed indications of prominence such that the mobile computing device displays the first and second posts in first and second positions, respectively, based at least in part on the indications of prominence.

14. The computer-implemented method of claim 13, wherein the displayed indication of each particular post includes a display of the particular post in a vertical stack of posts, the displayed indication of prominence of each particular post being a position in the vertical stack.

15. The computer-implemented method of claim 13, wherein the displayed indication of each particular post includes a display of a marker located on a map at the location that is associated with the particular post, the indication of the prominence of each particular post being a type of marker.

16. The computer-implemented method of claim 13, wherein displaying the indication of each particular post includes displaying the content for each of the particular posts in different pages that are navigable in a sequence, the displayed indication of prominence of each particular post being an order in the sequence.

17. A computer system comprising:
   one or more processors, and one or more memory devices coupled with the one or more processors, the one or more processors configured for:
   receiving, at a server system and from a computing device that is remote from the server system, a request that the server system deliver to the computing device textual posts that a plurality of authors have submitted to a messaging system, each particular post of at least some of the posts being associated with a geographical place of posting from which the particular post is determined to have been authored;
   identifying, by the server system and for each particular post, a value that represents a geographical distance from a location that is associated with the computing device to the geographical place of posting for the particular post;
   determining, by the server system and for each particular post, a score for the particular post, the score being based on at least the value that represents the geographical distance to the geographical place of posting for the particular post and whether the geographical distance meets a threshold; and
   providing, by the server system and to the computing device for each particular post, an indication of the score for the particular post, so as to cause the computing device to display an indication of each particular post and visibly indicate a prominence of each particular post, the indication of prominence of each particular post being based at least in part on the indication of the score for each particular post, at least two of the particular posts, including a first post and a second post, having different visible indications of prominence based at least in part on the at least two particular posts having different indications of scores, the first and second posts being displayed by the computing device in first and second positions, respectively, based at least in part on the different indications of scores between the posts.

18. The computer system of claim 17, wherein the location that is associated with the computing device is an estimated geographical location of the computing device as determined using wireless signals.

19. A computer system comprising:
one or more processors on a mobile computing device; and
one or more memory devices coupled with the one or more processors, the one or more processors configured for:
determining, by the mobile computing device, a location that is associated with the mobile computing device;
receiving, at the mobile computing device, user input for causing the mobile computing device to display indications of textual posts that a plurality of authors have submitted to a messaging service;
submitting, by the mobile computing device and to a server system, a request for the posts and the location that is associated with the mobile computing device;
receiving, at the mobile computing device and from the server system, for each particular post of at least a plurality of the posts, an indication of a prominence of the particular post, the received indication of prominence having been determined by the server system for each particular post based at least in part on a distance between the location that is associated with the mobile computing device and a location that is associated with the particular post and whether the geographical distance meets a threshold; and
displaying, by the mobile computing device, an indication of each particular post and the indication of the prominence for each particular post, at least two of the particular posts, including a first post and a second post, having different displayed indications of prominence such that the mobile computing device displays the first and second posts in first and second positions, respectively, based at least in part on the indications of prominence.

20. One or more computer-readable devices including instructions that, when executed by one or more processors, cause performance of operations, the operations comprising:
receiving, at a server system and from a computing device that is remote from the server system, a request that the server system deliver to the computing device textual posts that a plurality of authors have submitted to a messaging system, each particular post of at least some of the posts being associated with a geographical place of posting from which the particular post is determined to have been authored;
identifying, by the server system and for each particular post, a value that represents a geographical distance from a location that is associated with the computing device to the geographical place of posting for the particular post;
determining, by the server system and for each particular post, a score for the particular post, the score being based on at least the value that represents the geographical distance to the geographical place of posting for the particular post and whether the geographical distance meets a threshold; and
providing, by the server system and to the computing device for each particular post, an indication of the score for the particular post, so as to cause the computing device to display an indication of each particular post and visibly indicate a prominence of each particular post, the indication of prominence of each particular post being based at least in part on the indication of the score for each particular post, at least two of the particular posts, including a first post and a second post, having different visible indications of prominence based at least in part on the at least two particular posts having different indications of scores, the first and second posts being displayed by the computing device in first and second positions, respectively, based at least in part on the different indications of scores between the posts.

21. One or more computer-readable devices including instructions that, when executed by one or more processors, cause performance of operations, the operations comprising:
determining, by a mobile computing device, a location that is associated with the mobile computing device;
receiving, at the mobile computing device, user input for causing the mobile computing device to display indications of textual posts that a plurality of authors have submitted to a messaging service;
submitting, by the mobile computing device and to a server system, a request for the posts and the location that is associated with the mobile computing device;
receiving, at the mobile computing device and from the server system, for each particular post of at least a plurality of the posts, an indication of a prominence of the particular post, the received indication of prominence having been determined by the server system for each particular post based at least in part on a distance between the location that is associated with the mobile computing device and a location that is associated with the particular post and whether the geographical distance meets a threshold; and
displaying, by the mobile computing device, an indication of each particular post and the indication of the prominence for each particular post, at least two of the particular posts, including a first post and a second post, having different displayed indications of prominence such that the mobile computing device displays the first and second posts in first and second positions, respectively, based at least in part on the indications of prominence.

* * * * *